(12) United States Patent
Ye et al.

(10) Patent No.: US 12,200,785 B2
(45) Date of Patent: Jan. 14, 2025

(54) USER EQUIPMENT AND BASE STATION, AND METHOD EXECUTED BY USER EQUIPMENT AND BASE STATION

(71) Applicant: NTT DOCOMO, INC., Tokyo (JP)

(72) Inventors: Neng Ye, Beijing (CN); Xiangming Li, Beijing (CN); Wenjia Liu, Beijing (CN); Xiaolin Hou, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 523 days.

(21) Appl. No.: 17/423,792

(22) PCT Filed: Jan. 18, 2019

(86) PCT No.: PCT/CN2019/072439
§ 371 (c)(1),
(2) Date: Jul. 16, 2021

(87) PCT Pub. No.: WO2020/147133
PCT Pub. Date: Jul. 23, 2020

(65) Prior Publication Data
US 2022/0124843 A1 Apr. 21, 2022

(51) Int. Cl.
*H04W 76/11* (2018.01)

(52) U.S. Cl.
CPC .................. *H04W 76/11* (2018.02)

(58) Field of Classification Search
CPC ..... H04W 76/11; H04W 76/12; H04W 76/14; H04W 76/15; H04W 76/18; H04W 76/19
See application file for complete search history.

(56) References Cited

U.S. PATENT DOCUMENTS

| 2018/0139774 | A1 | 5/2018 | Ma et al. |
| 2018/0288746 | A1 | 10/2018 | Zhang et al. |
| 2020/0059935 | A1* | 2/2020 | Qian .................. H04W 72/52 |
| 2020/0154481 | A1* | 5/2020 | Goto .................. H04W 28/04 |

(Continued)

FOREIGN PATENT DOCUMENTS

| CN | 107666373 A | 2/2018 |
| CN | 112005591 A | * 11/2020 |

(Continued)

OTHER PUBLICATIONS

3GPP TSG RAN WG1 Meeting #94bis; R1-1810378 "Evaluations for NOMA" vivo; Chengdu, China; Oct. 8-12, 2018 (6 pages).

(Continued)

*Primary Examiner* — Phong La
(74) *Attorney, Agent, or Firm* — Osha Bergman Watanabe & Burton LLP

(57) ABSTRACT

Embodiments of the present disclosure provide a user equipment and a base station that can be used in a wireless communication system, or a method executed by a user equipment and a base station. The user equipment in the embodiments of the present invention includes: a control unit, configured to acquire a multiple access signature, wherein the multiple access signature is determined, from a multiple access signature pool, according to activation information of the user equipment, and the activation information of the user equipment is related to the activation of the user equipment; and a sending unit, configured to use the multiple access signature to send data.

9 Claims, 13 Drawing Sheets

(56) References Cited

U.S. PATENT DOCUMENTS

2020/0322994 A1* 10/2020 Tian .................. H04W 74/0833
2021/0067300 A1*  3/2021 Pan ....................... H04W 24/10
2022/0124843 A1*  4/2022 Ye ....................... H04W 74/006

FOREIGN PATENT DOCUMENTS

| CN | 111466132 B | * | 8/2023 | ............. | H04J 13/16 |
| WO | WO 2019205073 | * | 10/2019 | | |
| WO | WO 2020091363 | * | 5/2020 | | |
| WO | WO-2020091363 A1 | * | 5/2020 | ............. | H04J 15/00 |

OTHER PUBLICATIONS

International Search Report issued in International Application No. PCT/CN2019/072439, mailed Sep. 27, 2019 (2 pages).
Written Opinion issued in International Application No. PCT/CN2019/072439; Dated Sep. 27, 2019 (3 pages).

* cited by examiner

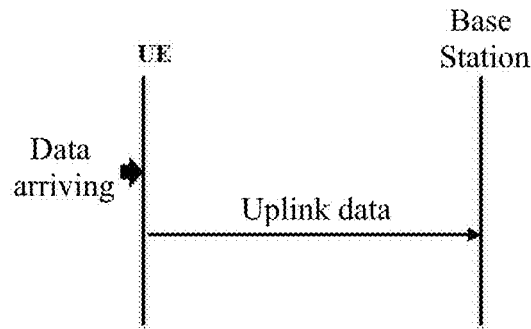
FIG.4
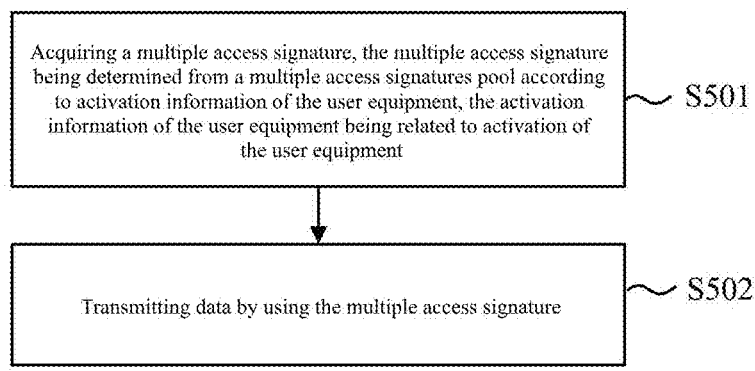
FIG.5
FIG.6

$$S_{4\times 6} = \begin{bmatrix} -0.08+0.23i & -0.20-0.20i & -0.01-0.23i & 1.37-1.33i & 0.97-0.27i & 0.68+0.01i \\ -0.50-0.47i & 0.26+0.55i & -1.06-0.40i & 0.54+0.34i & 0.48-0.66i & -0.12-0.25i \\ -0.32-0.22i & -0.23+0.07i & 1.66+0.18i & 0.25-0.14i & 0.27-0.62i & -1.36+0.19i \\ -0.52-0.19i & -0.52-0.47i & 0.13+0.12i & -0.08+0.63i & -0.45-0.54i & 1.15-0.44i \end{bmatrix}$$

```
-1.0000 + 7.0000i   -1.0000 + 3.0000i   3.0000 + 1.0000i   3.0000 - 7.0000i   1.0000 + 3.0000i   -1.0000 + 7.0000i
 3.0000 - 1.0000i    7.0000 + 7.0000i   1.0000 + 7.0000i   3.0000 + 1.0000i   3.0000 + 3.0000i   -3.0000 + 1.0000i
 5.0000 - 1.0000i   -3.0000 - 1.0000i   7.0000 - 1.0000i   1.0000 + 3.0000i   3.0000 + 5.0000i   -1.0000 - 3.0000i
-7.0000 - 3.0000i   -1.0000 + 3.0000i   1.0000 + 3.0000i  -1.0000 + 5.0000i   1.0000 + 3.0000i    7.0000 + 7.0000i
```

$$S_{4\times 6} = \begin{bmatrix} -0.1576+0.4899i & -0.2617+0.1310i & 0.1018-0.0088i & 0.1995-0.8814i & -0.0227+0.3484i & -0.1188+0.4933i \\ 0.0633-0.1919i & 0.6021+0.5987i & 0.0261+0.6551i & 0.1113-0.0640i & 0.2358+0.1480i & -0.4007-0.0785i \\ 0.2433-0.1698i & -0.3501-0.1269i & 0.6968-0.1376i & -0.0754+0.1892i & 0.1685+0.7946i & -0.2009-0.3307i \\ -0.7325-0.2642i & -0.1475+0.1814i & 0.0246+0.2338i & -0.1491+0.3212i & 0.0302+0.3741i & 0.4333+0.4884i \end{bmatrix}$$

```
-1.0000 + 7.0000i   -1.0000 + 3.0000i   3.0000 + 1.0000i   3.0000 - 7.0000i   1.0000 + 5.0000i   -1.0000 + 7.0000i
 1.0000 - 1.0000i    7.0000 + 7.0000i   1.0000 + 7.0000i   3.0000 + 1.0000i   3.0000 + 3.0000i   -3.0000 + 1.0000i
 3.0000 - 1.0000i   -1.0000 + 1.0000i   7.0000 - 1.0000i   1.0000 + 3.0000i   3.0000 + 7.0000i   -1.0000 - 3.0000i
-7.0000 - 1.0000i   -1.0000 + 3.0000i   1.0000 + 3.0000i  -1.0000 + 5.0000i   1.0000 + 5.0000i    5.0000 + 7.0000i
```

Figures 13A, 13B, 14:
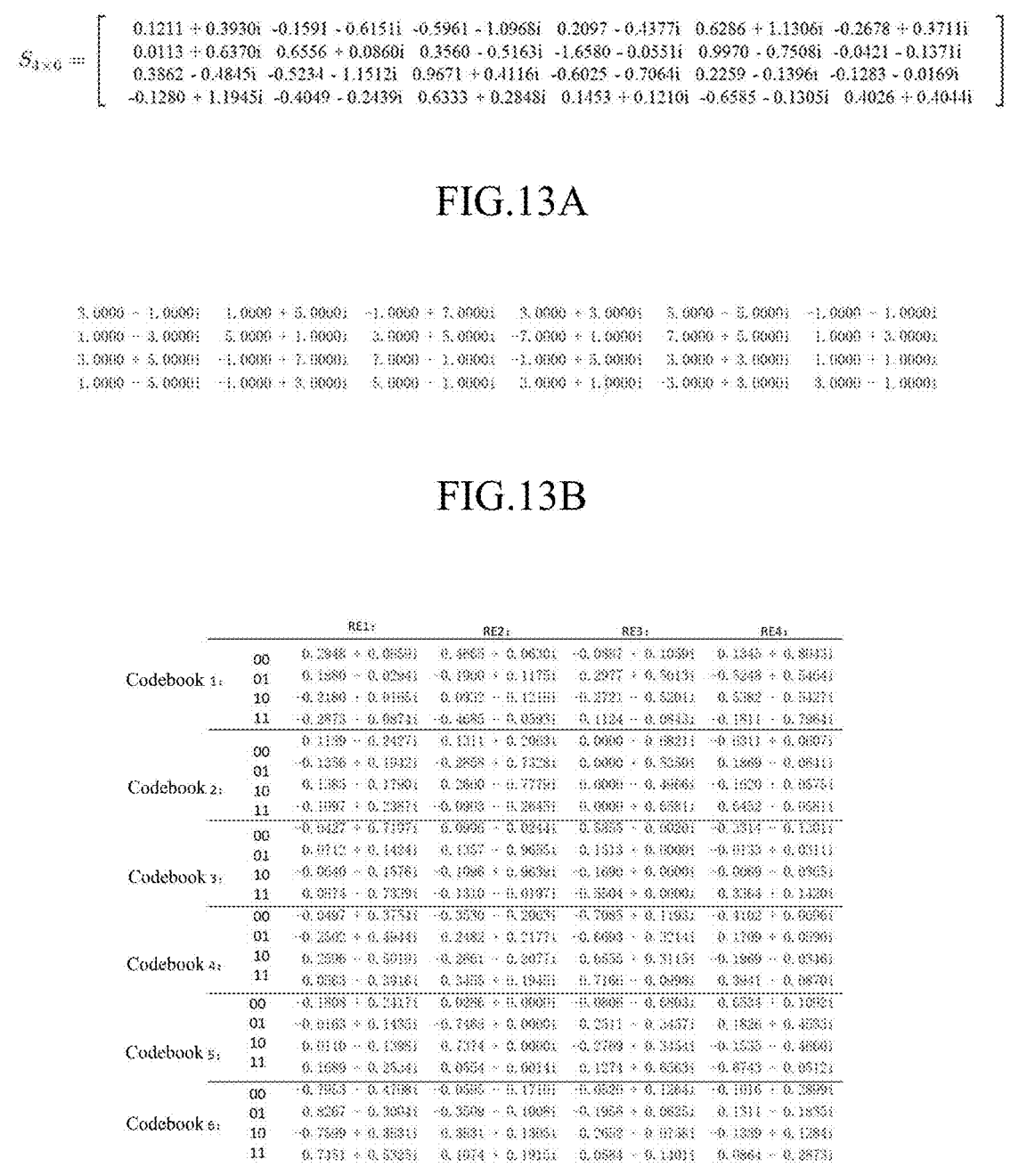

$$S_{4\times 6} = \begin{bmatrix} 0.1211 + 0.3930i & -0.1591 - 0.6151i & -0.5961 - 1.0968i & 0.2097 - 0.4377i & 0.6286 + 1.1306i & -0.2678 + 0.3711i \\ 0.0113 + 0.6370i & 0.6556 + 0.0860i & 0.3560 - 0.5163i & -1.6580 - 0.0551i & 0.9970 - 0.7508i & -0.0421 - 0.1371i \\ 0.3862 - 0.4845i & -0.5234 - 1.1512i & 0.9671 + 0.4116i & -0.6025 - 0.7064i & 0.2259 - 0.1396i & -0.1283 - 0.0169i \\ -0.1280 + 1.1945i & -0.4049 - 0.2439i & 0.6333 + 0.2848i & 0.1453 + 0.1210i & -0.6585 - 0.1305i & 0.4026 + 0.4044i \end{bmatrix}$$

|  |  | RE1: | RE2: | RE3: | RE4: |
|---|---|---|---|---|---|
| Codebook 1: | 000 | 0.6654 − 0.3477i | 0.0240 + 0.0360i | −0.1139 + 0.0569i | −0.3367 − 0.5395i |
|  | 010 | 0.2914 + 0.6893i | 0.0395 + 0.0407i | 0.0188 − 0.0638i | 0.4668 + 0.4606i |
|  | 100 | 0.6586 − 0.3062i | 0.0249 + 0.0214i | −0.0854 + 0.0748i | −0.3240 − 0.5946i |
|  | 110 | −0.7791 − 0.5537i | −0.0419 + 0.0225i | 0.0032 − 0.0064i | −0.2897 + 0.0129i |
|  | 001 | 0.2707 + 0.7218i | 0.0391 − 0.0481i | 0.0481 − 0.0431i | 0.5083 + 0.3730i |
|  | 011 | −0.9166 − 0.2026i | −0.0403 − 0.0281i | 0.0187 + 0.0094i | −0.0686 + 0.3336i |
|  | 101 | −0.8105 − 0.5311i | −0.0724 + 0.0345i | 0.1173 − 0.0103i | −0.1897 − 0.0690i |
|  | 111 | −0.9395 − 0.1830i | −0.0871 − 0.0073i | 0.1270 + 0.0363i | 0.0254 + 0.2394i |
| Codebook 2: | 000 | 0.0241 − 0.0965i | 0.0643 + 0.0000i | 0.1314 − 0.9678i | 0.1471 − 0.1019i |
|  | 010 | 0.1987 − 0.4139i | −0.0993 − 0.0364i | −0.3927 + 0.3907i | 0.1027 + 0.5133i |
|  | 100 | 0.1836 − 0.2936i | 0.0043 − 0.0358i | 0.3852 − 0.8285i | 0.0179 + 0.2060i |
|  | 110 | −0.2828 + 0.2965i | 0.1293 + 0.0239i | −0.3851 − 0.3553i | 0.2385 − 0.5487i |
|  | 001 | 0.2421 − 0.4309i | −0.0985 + 0.0123i | −0.4801 + 0.4350i | 0.0739 + 0.5663i |
|  | 011 | −0.3483 + 0.3808i | 0.1114 + 0.0418i | −0.3712 − 0.0139i | 0.1997 − 0.5944i |
|  | 101 | −0.0258 + 0.2983i | −0.0184 − 0.0231i | 0.7291 + 0.5135i | −0.3167 − 0.1068i |
|  | 111 | −0.0114 + 0.3020i | −0.0228 − 0.0199i | 0.6410 + 0.6333i | −0.2821 − 0.1168i |
| Codebook 3: | 000 | 0.0189 − 0.2571i | −0.4347 + 0.3978i | 0.2192 + 0.1678i | 0.6530 − 0.2517i |
|  | 010 | −0.0231 − 0.1458i | 0.8846 − 0.4021i | 0.0653 + 0.1106i | 0.1307 + 0.0201i |
|  | 100 | 0.0341 − 0.1577i | −0.7756 − 0.1918i | 0.1449 + 0.0938i | 0.4858 − 0.2642i |
|  | 110 | −0.0022 − 0.0088i | −0.0615 + 0.9913i | 0.0506 + 0.0132i | 0.1033 − 0.0086i |
|  | 001 | −0.0149 − 0.0030i | 0.6427 − 0.7174i | −0.0478 − 0.0149i | −0.2421 + 0.1046i |
|  | 011 | −0.0135 − 0.1674i | 0.2134 + 0.8912i | −0.0648 − 0.0756i | −0.3187 + 0.1431i |
|  | 101 | 0.0349 − 0.1573i | −0.8082 − 0.5067i | −0.1267 − 0.1180i | −0.1835 − 0.0218i |
|  | 111 | −0.0128 + 0.2394i | −0.2370 − 0.6789i | −0.2210 − 0.1837i | −0.5508 + 0.1697i |
| Codebook 4: | 000 | 0.1209 + 0.1630i | −0.0999 − 0.0138i | 0.0421 + 0.9466i | −0.0368 + 0.4796i |
|  | 010 | −0.5498 + 0.4215i | −0.0307 − 0.0263i | 0.1185 − 0.0571i | 0.3951 + 0.5883i |
|  | 100 | −0.0785 + 0.2050i | −0.1129 + 0.0008i | 0.0147 + 0.8794i | −0.3141 + 0.2012i |
|  | 110 | 0.8919 + 0.4011i | 0.0844 − 0.0317i | −0.0633 − 0.0211i | 0.1108 − 0.1372i |
|  | 001 | −0.6900 + 0.2749i | 0.0112 − 0.0393i | 0.1122 − 0.1571i | 0.3366 + 0.5442i |
|  | 011 | 0.8568 + 0.3636i | 0.0897 + 0.0100i | −0.0697 − 0.1694i | 0.2042 − 0.2243i |
|  | 101 | −0.2160 + 0.7021i | −0.0585 + 0.0495i | −0.0495 + 0.1155i | −0.4996 + 0.4366i |
|  | 111 | −0.2088 + 0.6792i | −0.0389 + 0.0437i | −0.0583 − 0.1803i | −0.4468 + 0.5245i |
| Codebook 5: | 000 | −0.1366 + 0.1882i | 0.0148 + 0.0148i | −0.7987 + 0.6386i | 0.0886 − 0.1661i |
|  | 010 | −0.2468 + 0.4900i | 0.0458 + 0.0935i | −0.2186 + 0.6839i | −0.0917 − 0.4160i |
|  | 100 | −0.9343 − 0.1992i | 0.0460 + 0.0153i | −0.8773 − 0.2873i | 0.3218 + 0.0306i |
|  | 110 | 0.3790 − 0.4780i | −0.1336 − 0.0043i | 0.3486 − 0.0043i | −0.1163 + 0.6891i |
|  | 001 | −0.2882 + 0.5446i | 0.1121 − 0.0060i | 0.3723 − 0.1561i | −0.0921 − 0.6606i |
|  | 011 | 0.2652 − 0.2774i | −0.0932 − 0.0108i | 0.7814 − 0.0036i | −0.2043 − 0.4409i |
|  | 101 | 0.1802 − 0.4739i | −0.0198 − 0.0339i | −0.4817 − 0.5561i | 0.2586 + 0.3721i |
|  | 111 | −0.0778 + 0.2491i | 0.0467 − 0.0156i | 0.7979 − 0.4126i | −0.1440 − 0.3192i |
| Codebook 6: | 000 | 0.0000 + 0.2879i | 0.0681 − 0.7246i | 0.1610 + 0.1672i | 0.5449 − 0.1920i |
|  | 010 | 0.0000 − 0.3615i | 0.4571 + 0.1703i | 0.2659 + 0.2211i | 0.6842 − 0.2091i |
|  | 100 | 0.0000 − 0.1061i | −0.1900 − 0.9418i | 0.0442 − 0.0663i | 0.2121 − 0.1237i |
|  | 110 | 0.0000 + 0.1371i | 0.7998 + 0.1968i | −0.1441 − 0.0949i | −0.4780 + 0.2425i |
|  | 001 | 0.0000 + 0.1447i | −0.8832 + 0.4379i | −0.0371 − 0.0705i | 0.0297 − 0.0037i |
|  | 011 | 0.0000 − 0.1782i | 0.7870 + 0.5078i | 0.1446 + 0.1211i | 0.2354 + 0.0000i |
|  | 101 | 0.0000 + 0.3565i | 0.1814 + 0.1305i | −0.2578 − 0.2228i | −0.7893 + 0.2896i |
|  | 111 | 0.0000 + 0.2884i | −0.7994 + 0.4374i | −0.1395 − 0.1712i | −0.4215 + 0.0919i |

MA sequences

USER EQUIPMENT AND BASE STATION, AND METHOD EXECUTED BY USER EQUIPMENT AND BASE STATION

TECHNICAL FIELD

The present disclosure relates to a field of wireless communication, and in particular, to a user equipment and a base station that can be used in a wireless communication system, or a method executed by the user equipment or the base station

BACKGROUND

Non-Orthogonal Multiple Access (NOMA) technology is a radio access technology proposed in the Long Term Evolution (LTE) version R-13 studied by the Third Generation Partnership Project (3GPP), which may also be further applied in a 5G New Radio (NR) scenario.

Uplink data transmission modes under NOMA may include grant-based transmission and grant-free transmission. In the case of grant-based transmission, a user equipment (UE) may first transmit a request for uplink data transmission to a base station, and then the base station configures corresponding data transmission resources to the UE, so that the UE can use the allocated resources for data transmission. In the case of grant-free transmission, the base station may pre-configure data transmission resources for the UE, and when the UE needs to perform uplink data transmission, it use the resources pre-configured by the base station for data transmission; or, the UE may directly perform uplink data transmission without the base station pre-configuring data transmission resources.

In the above processes of grant-based transmission and grant-free transmission, each UE can use a Multiple Access signature (MA signature) specific to this UE for data transmission, to distinguish between different UEs and reduce interference between different UEs. Generally, the multiple access signature may be used to indicate a configuration of transmitted logical resources and/or physical resources of uplink data. For example, the multiple access signature may include one or more of information indicating a transmission power adopted by the user equipment when transmitting data, information indicating an interleaving manner adopted by the user equipment when transmitting data, information indicating a scrambling manner adopted the user equipment when transmitting data, information indicating a spreading manner adopted by the user equipment when transmitting data, and information indicating a bit-to-symbol mapping manner adopted the user equipment when transmitting data. In the current grant-free transmission process, UE generally uses a MA signature for grant-based transmission to transmit uplink data. However, in grant-free transmission, UE has a characteristic of random activation, and interference suffered by each UE is random, where a specific form of an interference distribution function is related to UE activation information such as a UE activation probability. In the MA signature design, if it is assumed that all UEs transmit data at the same time, each UE will be interfered by all other UE signals, which is obtained from a design for the worst case. It can be seen that this MA signature design/grouping/distribution method does not adapt to a characteristic of sparse transmission in grant-free transmission, which will reduce an accuracy of symbol detection and affect a performance of the wireless communication system.

Taking into account the above application scenarios, it is desired to provide a method executed by a user equipment and a base station suitable for grant-free transmission process to mine UE's characteristic of sparse activation, so as to reduce interference of data transmission between UEs, increase accuracy of symbol detection, and improve the performance of the wireless communication system.

SUMMARY OF THE DISCLOSURE

According to an aspect of the present disclosure, there is provided a user equipment, comprising: a control unit configured to acquire a multiple access signature, the multiple access signature being determined from a multiple access signature pool according to activation information of the user equipment, the activation information of the user equipment being related to activation of the user equipment; a transmitting unit configured to transmit data by using the multiple access signature.

Further, the control unit acquires the activation information of the user equipment; and acquires the multiple access signature determined by the user equipment from the multiple access signature pool according to the activation information.

Further, the user equipment further comprises a receiving unit configured to receive information about a group of multiple access signatures transmitted by a base station, the information about the group of multiple access signatures being used to indicate at least one group of multiple access signatures in the multiple access signature pool, and each group of multiple access signatures including at least one multiple access signature; the control unit determines the multiple access signature based on the activation information of the user equipment and the information about the group of multiple access signatures.

Further, the control unit acquires the activation information of the user equipment; the transmitting unit transmits the activation information of the user equipment to a base station, so that the base station determines, from the multiple access signature pool, at least one of the multiple access signature and a group of multiple access signatures according to the activation information of the user equipment; the user equipment further comprises a receiving unit configured to receive at least one of information about the multiple access signature and the group of multiple access signatures determined by the base station, to acquire the multiple access signature.

Further, the transmitting unit transmits, to a base station, an indication signal indicating the base station to estimate the activation information of the user equipment; the user equipment further comprises a receiving unit configured to receive information about the multiple access signature from the base station, the information about the multiple access signature being used to indicate the multiple access signature, and the multiple access signature being determined from the multiple access signature pool by the base station according to an estimation result of the activation information of the user equipment.

Further, the control unit acquires the activation information of the user equipment according to at least one of historical activation information and higher layer activation information, wherein the historical activation information indicates information related to historical activation behaviors of the user equipment, and the higher layer activation information is information related to activation of the user equipment notified by a higher layer.

Further, the multiple access signature includes at least one of a bit-to-symbol mapping and a spreading sequence.

Further, multiple access signatures in the multiple access signature pool are constructed based on an error rate of symbol detection and an error rate of detection for the user equipment's activation state by using a deep learning algorithm; or at least a part of multiple access signatures in the multiple access signature pool are acquired based on another multiple access signature pool.

According to another embodiment of the present disclosure, there is provided a base station, comprising: a control unit configured to acquire activation information of a user equipment, the activation information of the user equipment being related to activation of the user equipment, and determine, from a multiple access signature pool, at least one of a group of multiple access signatures and a multiple access signature used by the user equipment for data transmission at least according to the activation information of the user equipment, each group of multiple access signatures including at least one multiple access signature; a transmitting unit configured to transmit at least one of information about the group of multiple access signatures and information about the multiple access signature.

Further, the base station further comprises a receiving unit configured to receive the activation information transmitted by the user equipment; the control unit acquires the activation information received by the receiving unit.

Further, the base station further comprises a receiving unit configured to receive an indication signal transmitted by the user equipment indicating the base station to estimate the activation information of the user equipment; the control unit estimates the activation information of the user equipment according to the indication signal.

Further, the control unit estimates the activation information of the user equipment according to at least one of historical activation information and higher layer activation information, wherein the historical activation information indicates information related to historical activation behaviors of the user equipment, and the higher layer activation information is information related to activation of the user equipment notified by a higher layer.

Further, the multiple access signature includes at least one of a bit-to-symbol mapping and a spreading sequence.

Further, multiple access signatures in the multiple access signature pool are constructed based on an error rate of symbol detection and an error rate of detection for the user equipment's activation state by using a deep learning algorithm; or at least a part of multiple access signatures in the multiple access signature pool are acquired based on another multiple access signature pool.

Further, the control unit determines, from the multiple access signature pool, at least one of the group of multiple access signatures and the multiple access signature used by the user equipment for data transmission, according to the activation information of the user equipment and the number of user equipment in a cell corresponding to the base station.

According to another embodiment of the present disclosure, there is provided a method executed by a user equipment, the method comprising: acquiring a multiple access signature, the multiple access signature being determined from a multiple access signatures pool according to activation information of the user equipment, the activation information of the user equipment being related to activation of the user equipment; transmitting data by using the multiple access signature.

Further, the acquiring a multiple access signature includes: acquiring the activation information of the user equipment; and acquiring the multiple access signature determined by the user equipment from the multiple access signature pool according to the activation information.

Further, the acquiring a multiple access signature includes: receiving information about a group of multiple access signatures transmitted by a base station, the information about the group of multiple access signatures being used to indicate at least one group of multiple access signatures in the multiple access signature pool, and each group of multiple access signatures including at least one multiple access signature; determining the multiple access signature based on the activation information of the user equipment and the information about the group of multiple access signatures.

Further, the acquiring a multiple access signature includes: acquiring the activation information of the user equipment; transmitting the activation information of the user equipment to a base station, so that the base station determines, from the multiple access signature pool, at least one of the multiple access signature and a group of multiple access signatures according to the activation information of the user equipment; receiving at least one of information about the multiple access signature and the group of multiple access signatures determined by the base station, to acquire the multiple access signature.

Further, the acquiring a multiple access signature includes: transmitting, to a base station, an indication signal indicating the base station to estimate the activation information of the user equipment; receiving information about the multiple access signature from the base station, the information about the multiple access signature being used to indicate the multiple access signature, and the multiple access signature being determined from the multiple access signature pool by the base station according to an estimation result of the activation information of the user equipment.

Further, the acquiring the activation information of the user equipment includes: acquiring the activation information of the user equipment according to at least one of historical activation information and higher layer activation information, wherein the historical activation information indicates information related to historical activation behaviors of the user equipment, and the higher layer activation information is information related to activation of the user equipment notified by a higher layer.

Further, the multiple access signature includes at least one of a bit-to-symbol mapping and a spreading sequence.

Further, multiple access signatures in the multiple access signature pool are constructed based on an error rate of symbol detection and an error rate of detection for the user equipment's activation state by using a deep learning algorithm; or at least a part of multiple access signatures in the multiple access signature pool are acquired based on another multiple access signature pool.

According to another embodiment of the present disclosure, there is provided a method executed by a base station, the method comprising: acquiring activation information of a user equipment, the activation information of the user equipment being related to activation of the user equipment, and determining, from a multiple access signature pool, at least one of a group of multiple access signatures and a multiple access signature used by the user equipment for data transmission at least according to the activation information of the user equipment, each group of multiple access signatures including at least one multiple access signature; transmitting at least one of information about the group of multiple access signatures and information about the multiple access signature.

Further, the acquiring activation information of a user equipment includes: receiving the activation information transmitted by the user equipment.

Further, the acquiring activation information of a user equipment includes: receiving an indication signal transmitted by the user equipment indicating the base station to estimate the activation information of the user equipment; estimating the activation information of the user equipment according to the indication signal.

Further, the estimating the activation information of the user equipment according to the indication signal includes: estimating the activation information of the user equipment according to at least one of historical activation information and higher layer activation information, wherein the historical activation information indicates information related to historical activation behaviors of the user equipment, and the higher layer activation information is information related to activation of the user equipment notified by a higher layer.

Further, the multiple access signature includes at least one of a bit-to-symbol mapping and a spreading sequence.

Further, multiple access signatures in the multiple access signature pool are constructed based on an error rate of symbol detection and an error rate of detection for the user equipment's activation state by using a deep learning algorithm; or at least a part of multiple access signatures in the multiple access signature pool are acquired based on another multiple access signature pool.

Further, the determining, from a multiple access signature pool, at least one of a group of multiple access signatures and a multiple access signature used by the user equipment for data transmission at least according to the activation information of the user equipment includes: determining, from the multiple access signature pool, at least one of the group of multiple access signatures and the multiple access signature used by the user equipment for data transmission, according to the activation information of the user equipment and the number of user equipment in a cell corresponding to the base station.

It can be seen that according to the embodiments of the present disclosure, UE activation information reflecting UE activation characteristics may be considered to provide MA signatures suitable for grant-free transmission, thereby reducing interference of data transmission between UEs, increasing accuracy of symbol detection, and improving the performance of the wireless communication system.

BRIEF DESCRIPTION OF THE DRAWINGS

The above and other objectives, features, advantages of the present disclosure will become clearer by describing embodiments of the present disclosure in details in conjunction with accompanying drawings.

FIG. 4 shows an implementation process of contention-based grant-free transmission;

FIG. 5 shows a flowchart of a method executed by a user equipment according to an embodiment of the present disclosure;

FIG. 6 shows an example of a multiple access signature pool constructed by a deep learning algorithm;

FIG. 13A shows an example of the MA signature pool, and FIG. 13B shows an example of the MA signature pool of FIG. 13A after quantization;

FIG. 14 shows an example of the MA signature pool;
FIG. 15 shows an example of the MA signature pool;
FIG. 16 shows an example of the MA signature pool;
FIG. 17 shows an example of the MA signature pool;
FIG. 18 shows an example of the MA signature pool.

DESCRIPTION OF THE EMBODIMENTS

Figure 1:
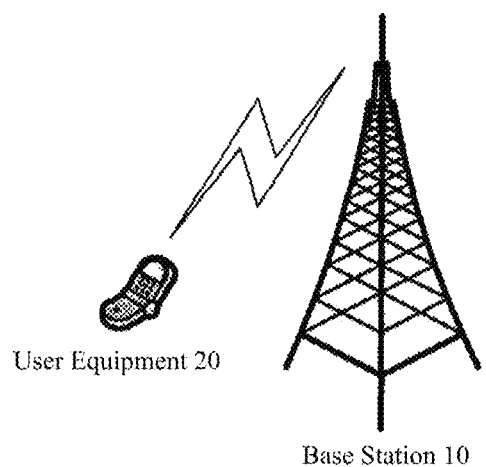
FIG. 1 shows a schematic diagram of a wireless communication system according to an embodiment of the present disclosure.

A method executed by a user equipment or a base station, a user equipment and a base station according to the embodiments of the present disclosure will be described below with reference to the accompanying drawings. Like reference numerals refer to like elements throughout the accompanying drawings. It should be understood that the embodiments described herein are merely illustrative and should not be construed as limiting the scope of the present disclosure.

First, a wireless communication system according to an embodiment of the present disclosure will be described with reference to FIG. 1. As shown in FIG. 1, the wireless communication system may include a base station 10 and a user equipment (UE) 20. The UE 20 may communicate with the base station 10. It should be appreciated that although one base station and one UE are shown in FIG. 1, this is only illustrative, and the wireless communication system may include one or more base stations and one or more UEs.

Figure 2:
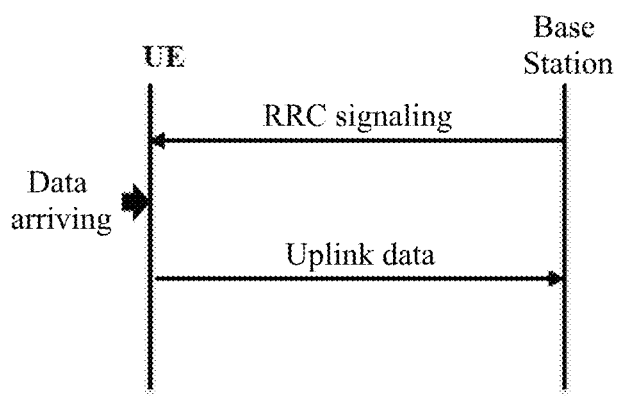
FIG. 2 shows an implementation process of the base station configuring data transmission resources to the UE through RRC signaling so that the UE performs grant-free transmission.

As mentioned earlier, grant-free transmission under NOMA may include multiple interaction modes between the base station and the UE. FIG. 2 shows an implementation process of the base station configuring data transmission resources to the UE through Radio Resource Control (RRC) signaling so that the UE performs grant-free transmission. As shown in FIG. 2, the base station may firstly use RRC signaling to configure the UE with, for example, one or more parameters of configuration information of grant-free data transmission resources, grant-free data transmission period, demodulation reference signals (DMRSs), a transport block size (TBS), a Modulation and Coding Scheme (MCS), transmission power, and a MA signature. After the UE receives the RRC signaling configuration of the base station, and when there is a need to perform uplink data transmission upon uplink data reaches the UE, the UE may use one or more of the aforementioned parameters pre-configured by the base station for uplink data transmission.

Figure 3:
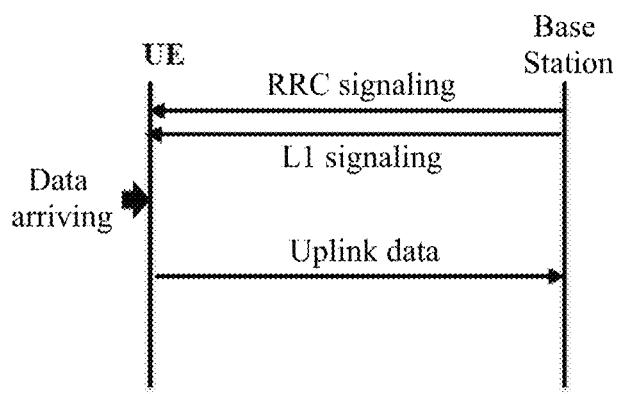
FIG. 3 shows an implementation process of the base station configuring data transmission resources to the UE through RRC and L1 signaling, so that the UE performs grant-free transmission.

FIG. 3 shows an implementation process of the base station configuring data transmission resources to the UE through Radio Resource Control (RRC) signaling and L1 signaling of L1 layer so that the UE performs grant-free transmission. As shown in FIG. 3, the base station may firstly use RRC signaling and L1 signaling to jointly configure the UE with, for example, one or more parameters of configuration information of grant-free data transmission resources, grant-free data transmission period, demodulation reference signals (DMRSs), a transport block size (TBS), a Modulation and Coding Scheme (MCS), transmission power, and a MA signature. For example, the base station may use RRC signaling to configure the UE with configuration information of grant-free data transmission resources, grant-free data transmission period and transmission power, and use L1 signaling to configure the UE with DMRSs, TBS/MCS, a MA signature, but is not limited thereto. After the UE receives the RRC signaling and L1 signaling configuration of the base station, and when there is a need to perform uplink data transmission upon uplink data reaches the UE, the UE may use one or more of the aforementioned parameters pre-configured by the base station for uplink data transmission.

FIG. 4 shows an implementation process of contention-based grant-free transmission. In the process shown in FIG. 4, the base station does not need to configure data transmission resources for the UE in advance, and the UE may directly perform uplink data transmission when uplink data reaches the UE.

In the various grant-free transmission processes shown in FIG. 2 to FIG. 4, each UE has a characteristic of random activation, that is, interference suffered by each UE is random, and a specific form of its interference distribution function is related to an activation probability reflected by activation information of this UE and other UEs. If grant-free transmission data is transmitted by using an MA signature of grant-based transmission, it will result in that only the case where all UEs are activated at the same time can be considered, that is, only the case where each UE is interfered by signals of all other UEs is considered, which is estimated for the worst state of uplink data transmission, and cannot accurately reflect an influence of UE activation information on MA signature design and/or allocation. The foregoing case of using an MA signature of grant-based transmission to transmit data for grant-free transmission may increase interference of data transmission between UEs and reduce accuracy of symbol detection.

In the embodiments of the present disclosure, it is desired to consider UE activation information reflecting UE activation characteristics to provide MA signatures suitable for grant-free transmission, thereby reducing interference of data transmission between UEs, increasing accuracy of symbol detection, and improving the performance of the wireless communication system.

FIG. 5 shows a flowchart of a method 500 executed by a user equipment according to an embodiment of the present disclosure.

As shown in FIG. 5, in step S501, a multiple access signature is acquired. The multiple access signature is determined from a multiple access signature pool according to activation information of the user equipment, and the activation information of the user equipment is related to activation of the user equipment.

In this step, the multiple access pool may include at least two multiple access signatures. Multiple access signatures in the multiple access signature pool may be acquired in a plurality of ways. In one example, the multiple access signatures in the multiple access signature pool may be constructed by using a deep learning algorithm, for example, may be constructed offline with a neural network by using the deep learning algorithm. Optionally, the multiple access signatures may be constructed based on an error rate of symbol detection and an error rate of detection for the user equipment's activation state. For example, the multiple access signature may be constructed by minimizing a weighted sum of the error rate of symbol detection and the error rate of detection for the user equipment's activation state. The multiple access signatures constructed by using the deep learning algorithm may include at least one of bit-to-symbol mappings and spreading sequences.

In the specific construction process using the deep learning algorithm, optionally, a neural network structure may be designed by using the deep learning algorithm to parameterize a variational function in a variational optimization problem, so as to acquire the multiple signature based on the activation information of the user equipment by introducing the error rate of symbol detection and the error rate of detection for the user equipment's activation state. The variational optimization problem P1 intended to reduce an error rate of detection (which may include symbol detection and detection of user equipment's activation state) in grant-free transmission may be expressed as:

$$P1: \min_{\theta,\phi} E_{p(x)}[L(\theta, \phi | x)]$$

where the above variational optimization problem P1 represents that $E_{p(x)}[L(\theta, \phi|x)]$ is minimized by changing $\theta$ and $\phi$; each element in the vector $x=[x_1, \ldots x_n, \ldots x_N]$ represents a source signal of each of N UEs (when it is 0, meaning that this UE is not activated); E means to average $L(\theta, \phi|x)$ in the case where x is made to satisfy the distribution of $p(x)$, and $L(\theta, \phi|x)$ may be specifically expressed as:

$$L(\theta, \phi | x) = E_{q_\phi(\tilde{s}|x)}[\log p_\theta(x | \tilde{s})] - KL(q_\phi(\tilde{s} | x) \| p_\theta(\tilde{s}))$$

where $E_{q_\phi(\tilde{s}|x)}[\log p_\theta(x|\tilde{s})]$ means to average $\log p_\theta(x|\tilde{s})$ in the case that x is given such that s satisfies the distribution $q_\phi(\tilde{s}|x)$; $KL(q_\phi(\tilde{s}|x)\|p_\theta(\tilde{s}))$ represents a KL divergence (Kullback-Leibler Divergence) between $q_\phi(\tilde{s}|x)$ and $p_\theta(\tilde{s})$; $L(\theta, \phi|x)$ represents a function determined by $\theta$ and $\phi$ for a given x; $q_\phi(\tilde{s}|x)$ in the formula represents an encoder, and $\phi$ is an adjustable parameter of the encoder; $p_\phi(x|\tilde{s})$ is a decoder, and $\theta$ is an adjustable parameter of the decoder; $p_\theta(\tilde{s})$ is a prior distribution of $\tilde{s}$, which is usually set as Gaussian distribution. $\tilde{s}$ may indicate a bit-to-symbol mapping, and when the result is a linear extension, it may indicate a linear spreading sequence. When $\tilde{s}$ is obtained and after all possible values of the source signal $x_n$ are traversed, a set of $\tilde{s}$ may be obtained, which is the corresponding multiple access signature pool.

In order to solve the above variational optimization problem P1, a deep learning algorithm may be used to introduce a neural network (for example, Deep Neural Network, DNN) to parameterize the above encoder $q_\phi(\tilde{s}|x)$ and/or decoder $p_\theta(x|\tilde{s})$, respectively, and obtain $\phi$ in the encoder $q_\phi(\tilde{s}|x)$ and/or $\theta$ in the decoder $p_\theta(x|\tilde{s})$, respectively. Optionally, the above neural network may be trained based on at least one of the error rate of symbol detection and the error rate of detection for the user equipment's activation state. For example, the total loss function L of the neural network may be expressed as:

$$\tilde{L} = \gamma_A \tilde{L}^A + \gamma_B \tilde{L}^B$$

where $\tilde{L}^A$ represents the error rate of symbol detection, for example, it may be the error rate of symbol detection by the base station; $\tilde{L}^B$ represents the error rate of detection for the user equipment's activation state; $\gamma_A$ and $\gamma_B$ are corresponding weights of $\tilde{L}^A$ and $\tilde{L}^B$, respectively, which may be a value between 0-1, for example. In other words, the total loss function $\tilde{L}$ of the neural network may be expressed as a weighted sum of the error rate of symbol detection and the error rate of detection for the user equipment's activation state.

When the above total loss function is introduced to train and optimize the neural network, the neural network may be trained by, for example, a gradient descent method, to obtain corresponding values of $\theta$ and/or $\phi$. For example, N sub-neural networks corresponding to N UEs may be used to parameterize $q_\phi(\tilde{s}|x)$. Let the n-th sub-neural network $f_{n,W_{fn}}(x_n)$ be:

$$f_{n,W_{fn}}(x_n) = \tilde{f}_{n,W_{fn}}(x_n) - \bar{f}_{n,W_{fn}} \qquad (0)$$

where $\tilde{f}_{n,W_{fn}}(x_n)$ is a typical fully-connected deep neural network with an input $x_n$ and a neural network parameter $W_{fn}$. Outputs of the N sub-networks are added together to obtain a composite symbol sequence as:

$$f_{W_f}(x) = \sum_{n=1}^{N} \sqrt{P_n}\, diag(h_n) f_{n,W_{fn}}(x_n), \text{ where } W_f = \{W_{f_1}...W_{f_N}\}.$$

where $P_n$ is a transmission power of the n-th user, $diag(h_n)$ is a diagonal matrix, and diagonal elements are channel parameters of the n-th UE.

Subsequently, $q_\varnothing(\tilde{s}|x)$ may be approximated as a probability encoder as shown below:

$$q_\phi(\tilde{s}|x) \leftarrow \mathcal{N}(\tilde{s} \mid f_{W_f}(x), \sigma_0^2 I)$$

where $\mathcal{N}$ is a Gaussian distribution function, $f_{W_f}(x)$ is an mean value of the Gaussian distribution, and $\sigma_0^2 I$ is a Gaussian distribution variance, where $\sigma_0^2$ is a noise variance, and I is a unit matrix.

According to the above formula, a value range of $\phi$ may be equivalent to a value range of the neural network parameter $W_f$.

After obtaining the training result of the neural network, the bit-to-symbol mapping (or the linear spreading sequence) $f_{n,W_{fn}}(x_n)$, that is, $\tilde{s}$, may be obtained by the value of $\theta$ and/or $\phi$, as well as the corresponding multiple access signature pool.

FIG. 6 shows an example of a multiple access signature pool constructed by the above deep learning algorithm. As shown in FIG. 6, the multiple access signature pool may be divided into a plurality of groups of multiple access signatures, and the groups of multiple access signatures may respectively correspond to a total number N of user equipment in the cell and activation probabilities of the user equipment. The number N of user equipment and the activation probabilities of the user equipment are both related to p(x), and may be used to generate a specific form of p(x), thereby obtaining a specific form of $q_\phi(\tilde{s}|x)$, and further obtaining the bit-to-symbol mapping or the spreading sequence $\tilde{s}$. In FIG. 6, for example, when the number N of UEs is 6, and there is only a UE activation probability-1, it may correspond to a multiple access signature group-1; when the number N of UEs is 20, and there is a UE activation probability-1 and a UE activation probability-2, it may correspond to a multiple access signature group-9, and the multiple access signature group-9 may include a subgroup 1 corresponding to a high activation probability and a subgroup 2 corresponding to a low activation probability. That is, if there are a total of 6 UEs in the cell, and activation probabilities of all UEs are UE activation probability-1 (e.g., 75%), it may correspond to the multiple access signature group-1 in the multiple access signature pool. If there are a total of 20 UEs in the cell, and activation probabilities of a part of (such as, 12) UEs are UE activation probability-1 (e.g., 75%), while activation probabilities of another part of UEs (such as, 8) are UE activation probability-2 (e.g., 50%), it may correspond to the multiple access signature group-9 in the multiple access signature pool, and the multiple access signature group-9 may include a subgroup 1 corresponding to 12 UEs with a high activation probability (e.g., 75%) and a subgroup 2 corresponding to 8 UEs with a low activation probability (e.g., 50%). When subsequently determining an MA signature corresponding to a certain UE according to the MA signature pool and/or MA signature groups, the specific correspondence of MA signatures (groups) that takes into account UE activation probabilities and the number of UEs in the cell as shown in FIG. 6 may be used to select the corresponding MA signature to improve the performance of the wireless communication system. The representation of the MA signature pool as shown in FIG. 6 and the correspondence of MA signature groups with the number of UEs, UE activation probabilities are only an example. In practical applications, any correspondence of MA signature groups and related parameters may be used, but are not limited to the number of UEs and UE activation probabilities herein. In addition, the correspondence between MA signature groups and parameters may also be arbitrary. In an example, a certain MA signature group may correspond to one or more value ranges of a certain parameter, rather than only a certain value of the parameter. For example, UE activation probability-1 may be an activation probability ranging from 50% to 75%, and correspond to a high activation probability; UE activation probability-2 may be an activation probability ranging from 25% to 50%, and correspond to a low activation probability.

The specific implementation of constructing MA signatures as well as obtaining the MA signature pool and MA signature groups by using a deep learning algorithm are described above in detail, and the correspondence between MA signature groups in the MA signature pool and related parameters (such as the number of UEs, UE activation probabilities) and the selection method are listed above. In another example, at least a part of multiple access signatures in the multiple access signature pool may also be acquired based on another multiple access signature pool, where the another multiple access signature pool may be a known multiple access signature pool, for example, may be a multiple access signature pool obtained according to multiple access signatures of grant-based transmission. In an example, the at least a part of the MA signature pool acquired from the another MA signature pool may be expressed as $S=\{s_1, s_2 \ldots s_N\}$, where each element represents one MA signature, and the MA signature pool may be used for N UEs, but of course it is not limited thereto.

After obtaining the MA signature pool according to any of the above methods, a MA signature corresponding to a UE may be obtained from the MA signature pool according to activation information of the user equipment. The activation information of the user equipment is related to activation of the user equipment. Optionally, the activation information of the user equipment may be an activation probability of the user equipment. For example, it may be assumed that the time axis is divided into multiple time units, and a probability that the UE has data arriving (there is data to be transmitted) in a certain time unit is defined as the activation probability of the UE. As another example, for a certain physical resource block that may perform uplink data transmission, a probability that the UE performs uplink data transmission on this physical resource block may be defined as the activation probability of the UE. In an example, the activation probability of the UE may be any value within the interval [0, 1], for example, the activation probability of the UE may be 25%.

Optionally, the activation information of the user equipment may also be an activation mode of the user equipment. In an example, the UE may have a periodic mode with an average transmission period T, and accordingly, a relationship with the activation probability of the UE may be obtained indirectly, which, for example, may be expressed as 1/T. In another example, the UE may have an activation mode of Poisson arrival mode. Specifically, a probability density function in the Poisson arrival model is expressed as: a probability distribution of the number of events that occur within the interval [t, t+τ]:

$$P[(N(t+\tau) - N(t)) = k] = \frac{e^{-\lambda\tau}(\lambda\tau)^k}{k!} \, k = 0, 1, \ldots$$

where P[A] represents a probability of occurrence of event A, t represents time, N(t) represents the number of events that have occurred as of time t, τ is a parameter representing time, and k represents the number of events (the value may be 0 or other positive integers) that have occurred, λ is a positive number and is called the arrival rate. When τ is 1, the above formula may be used to express the probability distribution of the number of events occurred per unit time. It can be seen that a probability of no event occurring (i.e., let k=0) may be expressed as exp(-λ); and correspondingly, the activation probability of this UE, that is, the probability of occurrence of events may be obtained indirectly, which, for example, may be expressed as 1−exp(-λ).

According to an embodiment of the present disclosure, the activation information of the UE may be acquired by the UE or by the base station. Optionally, the UE may acquire the activation information of the user equipment according to at least one of historical activation information and high layer activation information. The historical activation information indicates information related to historical activation behaviors of the user equipment, such as, for example, an average activation probability or an average transmission period of the UE within a certain period of preset time. The high layer activation information may be information related to the activation of the user equipment notified by a high layer. In an example, it may be business transmission information of the UE acquired by the UE through a service layer (application layer), for example, an average period or frequency acquired by the UE at which one or more applications (apps) need perform business transmission. Optionally, the base station may also acquire activation information of a certain user equipment according to at least one of historical activation information and high layer activation information. The historical activation information indicates information related to historical activation behaviors of the user equipment, such as, for example, an average activation probability or an average transmission period of the UE within a certain period of preset time. The high layer activation information may also be information related to the activation of the user equipment notified by a high layer, for example, business transmission information of the UE acquired by the base station through a service layer (application layer). When the base station acquires the activation information of the UE, the acquisition may be actively performed, or triggered by an indication signal transmitted by the UE indicating the base station to estimate the activation information of the UE, which is not limited herein.

After acquiring the activation information of the UE by the UE or the base station, the activation information of the UE may be transmitted by using signaling. In one implementation, the UE may acquire the activation information and transmit it to the base station. In an example, the UE may explicitly transmit the activation information via, for example, a Physical Uplink Shared Channel (PUSCH). Optionally, the UE may explicitly transmit a quantized bit value of the activation information through pre-appointed Radio Resource Control (RRC) signaling, MAC CEs, specific bit positions in a data report, etc. For example, the UE may use bit "11001" to transmit the activation probability of 25%. As another example, the UE may use bit "0" to represent the "Poisson arrival mode" and "111" to indicate that the parameter λ therein is 4; and use bit "1" to represent the "periodic mode" and "110" to indicate that its average transmission period T is 3. In other words, when the UE transmits "0111" in a specific bit position of PUSCH, it may be used to indicate that its activation information is the Poisson arrival mode with the parameter λ of 4.

In another example, the UE may also use a preset activation mode and its corresponding index value to implicitly transmit the activation information via a Physical Random Access Channel (PRACH), a Physical Uplink Control Channel (PUCCH), a Sounding Reference Signal (SRS) or the like. For example, when transmitting the UE activation probability, the index value of 1 may be specified as the activation probability [0, 1/3], the index value of 2 may be specified as the activation probability [1/3, 2/3], and the index value of 3 may be specified as [2/3, 1]. Therefore, when the UE transmits the index value through, for example, Msg.1 of PRACH or PUCCH, it may indicate a corresponding range of the UE activation probability. Alternatively, the UE may also transmit a respective index value and a corresponding activation probability by a specific configuration of SRS in sequences or resources. As another example, when transmitting the UE activation mode and its corresponding parameters, different index values may also be selected to correspond to different activation modes and parameters, and these index values may be transmitted via PRACHs, PUCCHs, or SRSs.

In addition, the UE may also transmit, for example, a 1-bit indication signal at a specific bit position via PRACH, PUCCH or the like, to indicate the base station to estimate the activation information of the UE. When receiving this indication signal, the base station may obtain the activation information of the UE according to at least one of the historical activation information and the high layer activation information, and transmit it to the UE during downlink transmission. When the base station informs the UE of its activation information, the specific explicit or implicit representation is similar to the representation on the UE side, which will not be repeatedly described herein.

The specific operation of acquiring the MA signature from the MA signature pool according to the activation information of the UE may be performed by the UE or by the base station. When the MA signature pool is constructed by a deep learning algorithm, optionally, MA signature groups in the MA signature pool may correspond to the number of UEs and UE activation information (UE activation probabilities or corresponding UE activation modes and related parameters). In this example, the base station may obtain a corresponding MA signature group from the MA signature pool according to the total number of UEs in the cell and/or UE activation information, and may subsequently acquire the MA signature that can be used by this UE from the MA signature group by using, for example, random selection or other selection methods, such as, a method of minimizing a collision probability of MA signatures between UEs. Alternatively, the UE may also select the MA signature for use from the MA signature pool or one or more MA signature groups according to the UE activation information by, for example, a random selection method, or further by using the UE activation information.

When the MA signature pool is obtained from another MA signature pool and is expressed as S={$s_1, s_2 \ldots s_N$}, the UE or the base station may obtain a correspondence between UEs and MA signatures in the MA signature pool by solving the following optimization problem, to obtain the MA signature used by the UE. The optimization problem is:

$$\min_{\pi} E_{P(I)}\left[\sum_{i \in I} \sum_{j \neq i, j \in I} |s^*_{\pi(i)} s_{\pi(j)}|\right]$$

where E means to average $\Sigma_{i \in I}\Sigma_{j \neq i, j \in I}|s^*_{\pi(i)} s_{\pi(j)}|$ in the case where the total number of UEs is N, and the activated UE group I satisfies the distribution p(I); π(i) is a sequence mapping function, that is, the $s_{\pi(i)}$-th sequence is mapped to the i-th UE; $s^*_{\pi(i)}$ is the conjugate transpose of $s_{\pi(i)}$; $s^*_{\pi(i)} s_{\pi(j)}$ represents correlation (interference) between the i-th UE and the j-th UE when the i-th UE is interfered by the j-th UE. It can be seen that by solving the above optimization problem, the MA signature obtained from another MA signature pool (such as a known MA signature pool) may correspond to UEs, and interference between activated UEs may be minimized, thereby further improving the performance of the wireless communication system. Therefore, the method of the embodiment of the present disclosure can not only reduce interference of data transmission between UEs by constructing new MA signatures, but also can reduce the interference and increase accuracy of symbol detection by re-adjusting the correspondence between known MA signatures and UEs.

According to an embodiment of the present disclosure, if the MA signature used by the UE is acquired by the UE itself, the UE may directly use the MA signature to transmit data in the subsequent steps. According to another embodiment of the present disclosure, if the MA signature or MA signature group used by the UE is determined by the base station, the base station needs to notify the UE through downlink transmission, so that the UE can use the selected MA signature, or further select the MA signature for data transmission in the selected MA signature group. Optionally, the MA signature pool, MA signature groups contained therein, and relevant UE activation parameters corresponding to the MA signature groups may be pre-stored on both sides of the UE and the base station; or, optionally, may be pre-configured to the UE by the base station through broadcast signaling such as System Information Blocks (SIBs)/Master Information Blocks (MIBs). Subsequently, the base station may transmit its selected MA signature group and/or MA signature to the UE through RRC signaling for static configuration or L1 layer signaling for semi-dynamic configuration (e.g., Downlink Control Information (DCI)). For example, the base station may use index 1 to indicate an index of the selected MA signature group, and use index 2 to indicate an index of the MA signature in this MA signature group. In the example of the MA signature pool shown in FIG. 6, the base station may transmit index 6 to indicate the MA signature group-6, and transmit index 2 to indicate the second MA signature in the MA signature group-6 at the same time through RRC signaling. Of course, in another example, the base station may also directly inform the UE of the selected MA signature.

Optionally, when the base station transmits the selected MA signature, it can also inform the UE in an implicit manner. In an example, the base station may quantify the selected MA signature into an M-QAM constellation diagram representation, and inform the UE of the result through corresponding signaling. In another example, the base station can also inform the UE of a corresponding constellation model and related parameter values of the selected MA signature. For example, if the MA signature has a parallelogram shape, the base station may inform the UE that the UE constellation diagram is a parallelogram by a pre-appointed related position or bit value, and subsequently inform the UE of the two side lengths of the parallelogram and the angle between them.

In the various grant-free transmission processes shown in FIGS. 2 to 4, when the aforementioned transmission of UE activation information and acquisition of MA signatures are taken into consideration, there may be a corresponding updated signaling interaction process between the UE and the base station. According to an embodiment of the present disclosure, the UE may firstly acquire the activation information of the user equipment; then, the UE transmits the activation information of the user equipment to the base station, so that the base station determines the multiple access signature from the multiple access signature pool according to the activation information of the user equipment; finally, the UE receives information about the multiple access signature indicating the multiple access signature determined by the base station to acquire the multiple access signature. Alternatively, according to another embodiment of the present disclosure, the UE may firstly transmit, to the base station, an indication signal indicating the base station to estimate the activation information of the user equipment, so that the base station estimates the activation information of the UE; then, the UE receives, from the base station, the multiple access signature determined from the multiple access signature pool according to an estimation result of the activation information of the user equipment.

Figure 7:
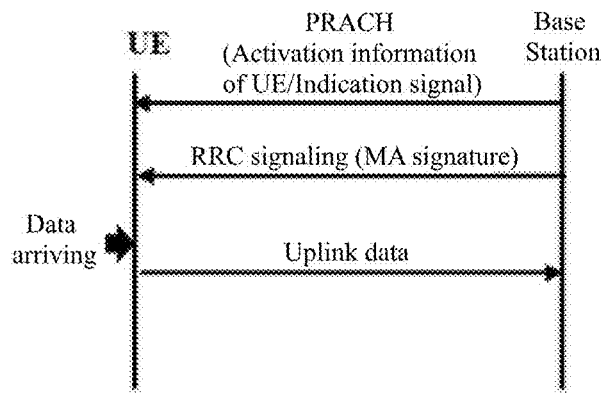
FIG. 7 shows an implementation process of grant-free transmission according to an embodiment of the present disclosure.

FIG. 7 shows an implementation process of grant-free transmission according to an embodiment of the present disclosure. As shown in FIG. 7, on the basis that the base station configures data transmission resources to the UE and realizes grant-free transmission through RRC signaling as shown in the above FIG. 2, before receiving RRC signaling, the UE may firstly transmit via PRACH the activation information of the UE or an indication signal used to indicate the base station to estimate the activation information of the UE to the base station, so that the base station selects the MA signature used by the UE from the MA signature pool according to the activation information of the UE or an estimation result. Then, the base station may transmit information about the MA signature through RRC signaling, so that the UE transmits uplink data by using the MA signature.

Figure 8:
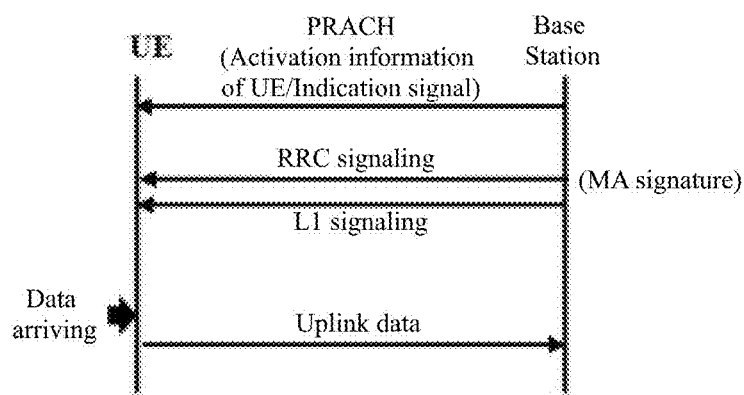
FIG. 8 shows an implementation process of grant-free transmission according to an embodiment of the present disclosure.

FIG. 8 shows an implementation process of grant-free transmission according to an embodiment of the present disclosure. As shown in FIG. 8, on the basis that the base station configures data transmission resources to the UE and realizes grant-free transmission through RRC signaling and L1 signaling as shown in the above FIG. 3, before receiving RRC signaling and L1 signaling, the UE may firstly transmit via PRACH the activation information of the UE or an indication signal used to indicate the base station to estimate the activation information of the UE to the base station, so that the base station selects the MA signature used by the UE from the MA signature pool according to the activation information of the UE or an estimation result. Then, the base station may transmit information about the MA signature through RRC signaling and L1 signaling, so that the UE transmits uplink data by using the MA signature.

Figure 9:
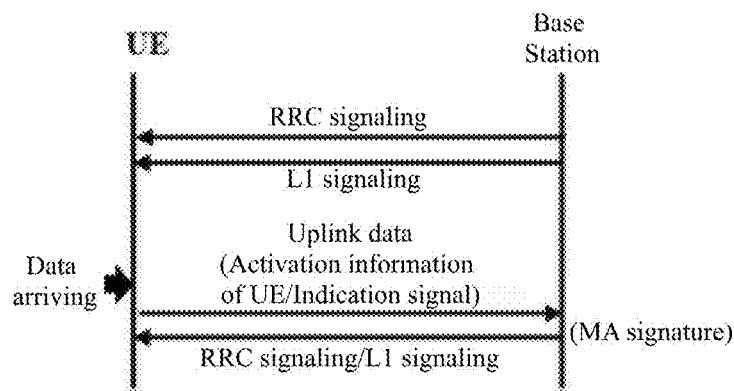
FIG. 9 shows an implementation process of grant-free transmission according to an embodiment of the present disclosure.

FIG. 9 shows an implementation process of grant-free transmission according to an embodiment of the present disclosure. As shown in FIG. 8, on the basis that the base station configures data transmission resources to the UE and realizes grant-free transmission through RRC signaling and L1 signaling as shown in the above FIG. 3, after receiving RRC signaling and L1 signaling, the UE may transmit via uplink data the activation information of the UE or an indication signal used to indicate the base station to estimate the activation information of the UE to the base station, so that the base station selects the MA signature used by the UE from the MA signature pool according to the activation information of the UE or an estimation result. Then, the base station may transmit information about the MA signature through RRC signaling and L1 signaling, so that the UE transmits uplink data by using the updated MA signature during the next uplink data transmission.

According to another embodiment of the present disclosure, the UE may firstly acquire the activation information of the user equipment; and the UE may acquire the multiple access signature determined from the multiple access signature pool according to the activation information. In one example, the UE may acquire its own activation information. In another example, the UE may also transmit an indication signal to the base station indicating the base station to estimate the activation information of the user equipment, so that the base station estimates the activation information of the UE; then, the UE may receive the estimated activation information of the UE from the base station.

Figures 10, 11A, 11B, 12A, 12B:
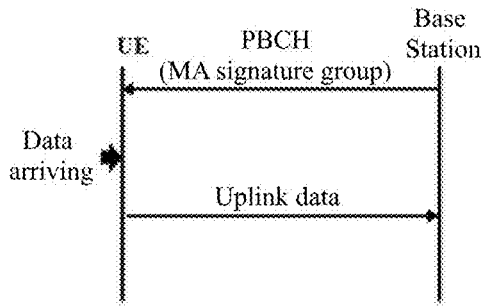
FIG. 10 shows an implementation process of grant-free transmission according to an embodiment of the present disclosure.
FIG. 11A shows an example of the MA signature pool.
FIG. 11B shows an example of the MA signature pool of FIG. 11A after quantization.
FIG. 12A shows an example of the MA signature pool.
FIG. 12B shows an example of the MA signature pool of FIG. 12A after quantization.

In addition, optionally, the UE may not only acquire the activation information of the user equipment, but also receive information about a group of multiple access signatures transmitted by the base station; then, the UE may determine the multiple access signature according to the activation information of the user equipment and the information about the group of multiple access signatures. The information about the group of multiple access signatures may be determined by the base station itself, or may be determined by estimating the activation information of the UE upon the base station is triggered by the indication information of the UE. FIG. 10 shows an implementation process of grant-free transmission according to an embodiment of the present disclosure. As shown in FIG. 10, based on the implementation process of the contention-based grant-free transmission shown in the previous FIG. 4, the base station may firstly transmit information about one or more MA signature groups via Physical Broadcast Channels (PBCHs), the UE then selects the MA signature for use from the MA signature group transmitted by the base station according to its activation information. Optionally, in the representation of the MA signature pool shown in FIG. 6, for example, when the base station knows the number of UEs in its corresponding cell and the UEs' activation information, it may select one of the MA signature groups for transmission to the UE; when the base station knows only one of the number of UEs in its corresponding cell and the UE's activation information, it may select one column or row of MA signature groups in FIG. 6 for transmission to the UE; when the base station knows neither of the number of UEs in the corresponding cell and the UEs' activation information, it may transmit the entire MA signature pool to the UE for the UE to select from. Optionally, the UE may further select an appropriate MA signature from the MA signature group according to the activation information; or, the UE may randomly select an MA signature from the MA signature group, which is not limited herein.

Returning to FIG. 5, in step S502, the UE transmits data by using the multiple access signature.

In this step, the UE may use the previously acquired MA signature to process the data to be transmitted based on the MA signature, and transmit the processed data.

Examples of an MA signature pool obtained by the method according to the embodiment of the present disclosure will be described below. In the embodiments of the present disclosure, for MA signatures represented by non-linear bit-to-symbol mapping, a set used to describe MA signatures (i.e., an MA signature pool or an MA signature group) may also be referred to as a matrix or codebook of MA signatures. Alternatively, the set used to describe MA signatures (i.e., an MA signature pool or an MA signature group) may also be referred to as an MA signature code book or codebook. Accordingly, an MA signature determined according to the MA signature pool or MA signature group may also be referred as a code word or codeword. In addition, for MA signatures represented by linear spreading sequences, a set of spreading sequences (i.e., an MA signature pool or an MA signature group) used to determine spreading sequences may also be referred to as a matrix or codebook of spreading sequences. Alternatively, the set of spreading sequences (i.e., an MA signature pool or an MA signature group) used to determine spreading sequences may also be referred to as a spreading sequence code book or codebook. Accordingly, a spreading sequence determined according to the set of spreading sequences may also be referred as a code word or codeword.

In each of the following examples, the total number of UEs in the cell is 6, 4 Resource Elements (REs) are used for NOMA transmission, the transmitted data may range from 2 bits to 4 bits, and the acquired MA signature pools are all linear codebooks, that is, linear spreading sequences. FIG. 11A shows an example of the MA signature pool in which the total number of UEs is 6, 4 REs are used to transmit 2-bit data, and activation probabilities of all the 6 UEs is 0.5; FIG. 11B shows an example of the MA signature pool of FIG. 11A after quantization. Both FIG. 11A and FIG. 11B show a 4×6 linear spreading sequence pool, where each row corresponds to one RE, and each column corresponds to one codebook of linear spreading sequences in the MA signature pool. In practical applications, each UE may correspond to one column of codebook in FIG. 11A or FIG. 11B, and transmit data based on its corresponding codebook. Of course, there is not necessarily a one-to-one correspondence between each UE and each codebook. In a specific data transmission process, a plurality of UEs may correspond to one of the codebooks, or one UE may select different codebooks for data transmission, which is not limited herein. FIG. 12A shows an example of the MA signature pool in which the total number of UEs is 6, 4 REs are used to transmit 2-bit data, and activation probabilities of all the 6 UEs is 0.75; FIG. 12B shows an example of the MA signature pool of FIG. 12A after quantization. FIG. 13A shows an example of an MA signature pool in which the total number of UEs is 6, 4 REs are used to transmit 2-bit data, activation probabilities of 3 UEs is 0.75, and activation probabilities of the other 3 UEs is 0.5; FIG. 13B shows an example of the MA signature pool of FIG. 13A after quantization. In the examples shown in FIG. 13A and FIG. 13B, considering the different UE activation probabilities, two or more MA signature groups may be divided in the MA signature pool, so that different MA signature groups may correspond to different UE activation probabilities. For example, codebooks of the first three columns of linear spreading sequences in FIG. 13A may be made to correspond to UEs with a high activation probability (0.75), and codebooks of the last three columns of linear spreading sequences may be made to correspond to UEs with a low activation probability (0.5). In this way, in a specific data transmission process, a UE with an activation probability of 0.75 may arbitrarily select from the first three columns of linear spreading sequences, and a UE with an activation probability of 0.5 may arbitrarily select from the last three columns of linear spreading sequences. This MA signature selection method takes into account activation characteristics of UEs, which may minimize interference of data transmission between UEs as much as possible and increase accuracy of symbol detection.

Figures 15, 16:
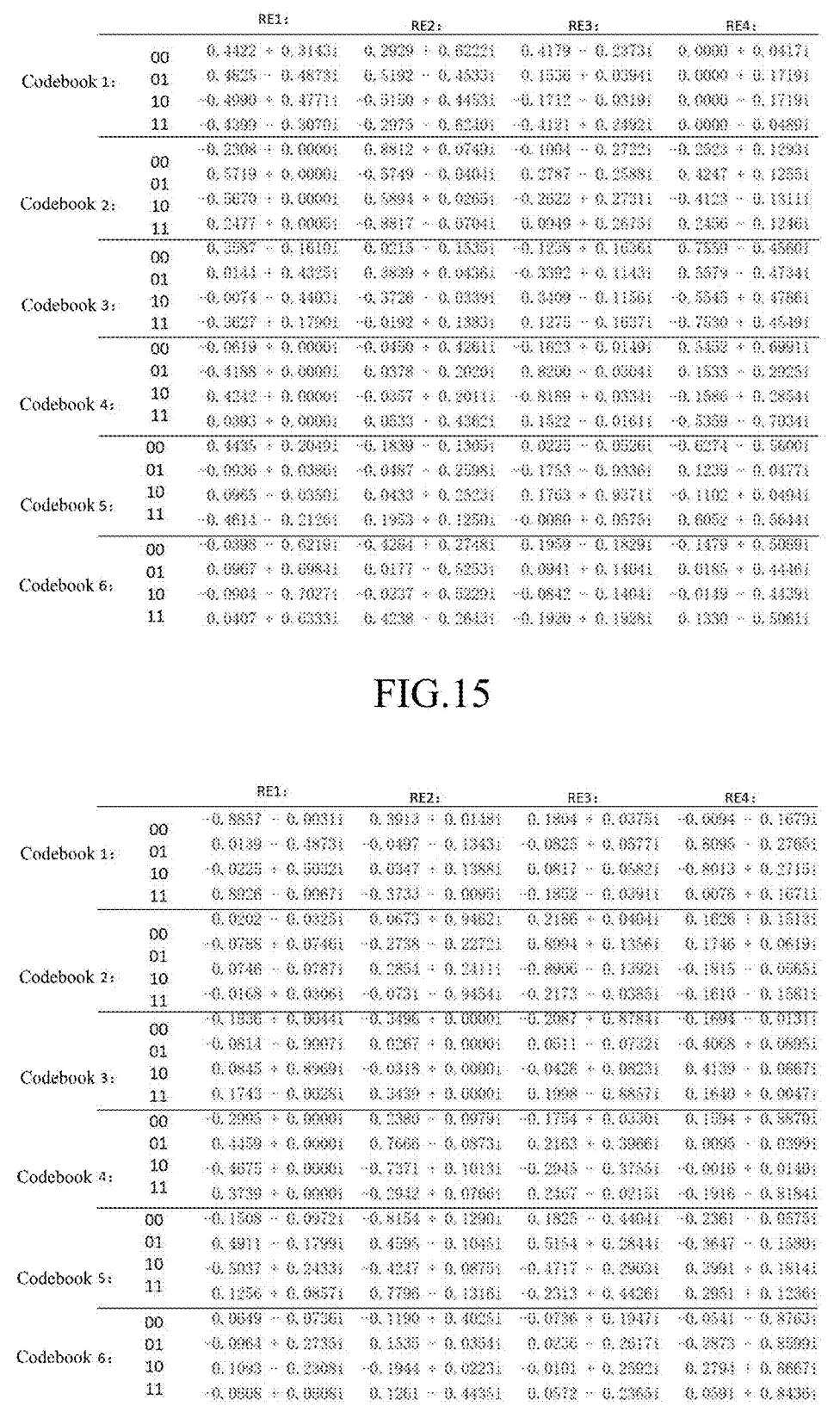
Figure 18:
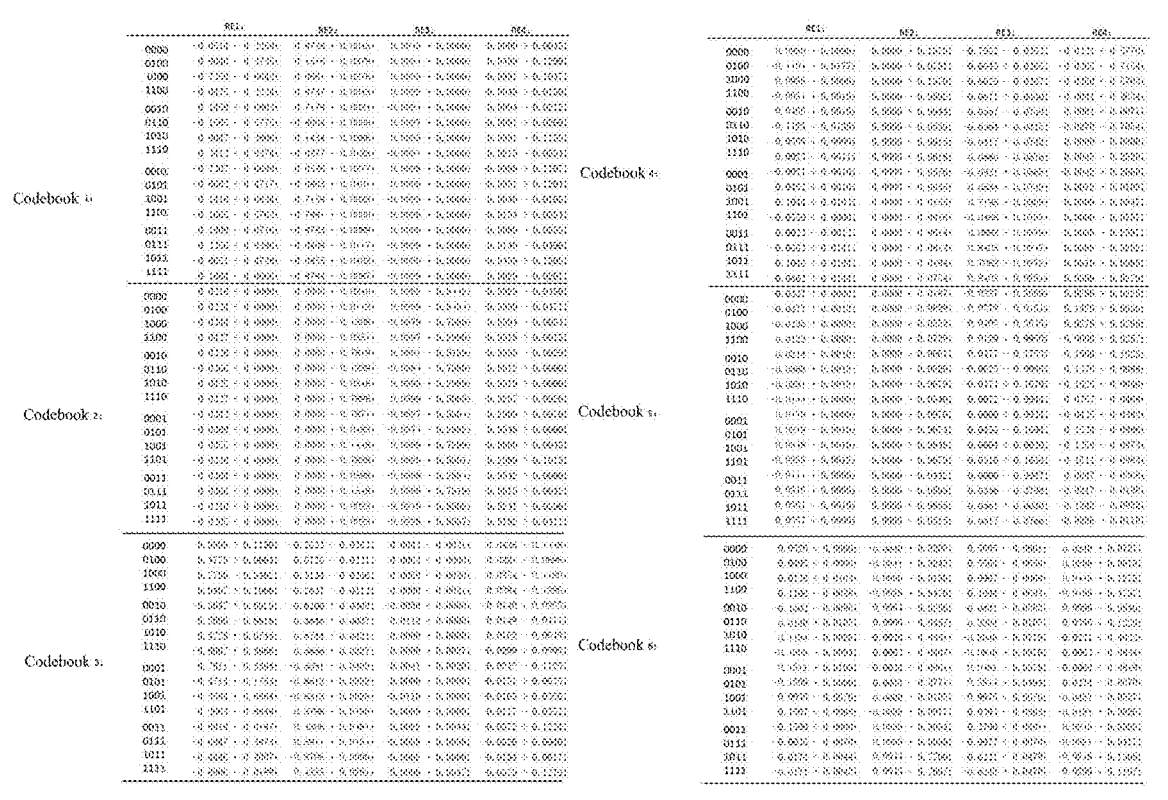

Examples of an MA signature pool or MA signature groups therein obtained by the method according to the embodiment of the present disclosure will be described below. In each of the following examples, the total number of UEs in the cell is 6, 4 Resource Elements (REs) are used for NOMA transmission, the transmitted data may range from 2 bits to 4 bits, and the acquired MA signature pools are all non-linear bit-to-symbol mappings. FIG. 14 shows an example of the MA signature pool in which the total number of UEs is 6, 4 REs are used to transmit 2-bit data, and activation probabilities of all the 6 UEs is 0.5. FIG. 15 shows an example of the MA signature pool in which the total number of UEs is 6, 4 REs are used to transmit 2-bit data, and activation probabilities of all the 6 UEs is 0.75. FIG. 16 shows an example of the MA signature pool in which the total number of UEs is 6, 4 REs are used to transmit 2-bit data, activation probabilities of 3 UEs is 0.75, and activation probabilities of the other 3 UEs is 0.5. FIG. 17 shows an example of the MA signature pool in which the total number of UEs is 6, 4 REs are used to transmit 3-bit data, and activation probabilities of all the 6 UEs is 0.5. FIG. 18 shows an example of the MA signature pool in which the total number of UEs is 6, 4 REs are used to transmit 4-bit data, and activation probabilities of all the 6 UEs is 0.5.

Similar to the aforementioned MA signature pools based on linear spreading sequences, FIGS. 14-18 each shows a mapping relationship of 6 codebooks on 4 REs. In practical applications, each UE may correspond to any of the codebooks in FIGS. 14-18, and transmit data based on its corresponding codebook. Of course, there is not necessarily a one-to-one correspondence between each UE and each codebook. In a specific data transmission process, a plurality of UEs may correspond to one of the codebooks, or one UE may select different codebooks for data transmission, which is not limited herein. Of course, considering the different UE activation probabilities, two or more MA signature groups may be divided in the MA signature pool, so that different MA signature groups may correspond to different UE activation probabilities, as shown in FIG. 16. For example, the first three codebooks in FIG. 16 may be made to correspond to UEs with a high activation probability (0.75), and the last three codebooks may be made to correspond to UEs with a low activation probability (0.5). In this way, in a specific data transmission process, a UE with an activation probability of 0.75 may arbitrarily select from the first three codebooks, and a UE with an activation probability of 0.5 may arbitrarily select from the last three codebooks. This MA signature selection method takes into account activation characteristics of UEs, which may minimize interference of data transmission between UEs as much as possible and increase accuracy of symbol detection.

Figure 19:
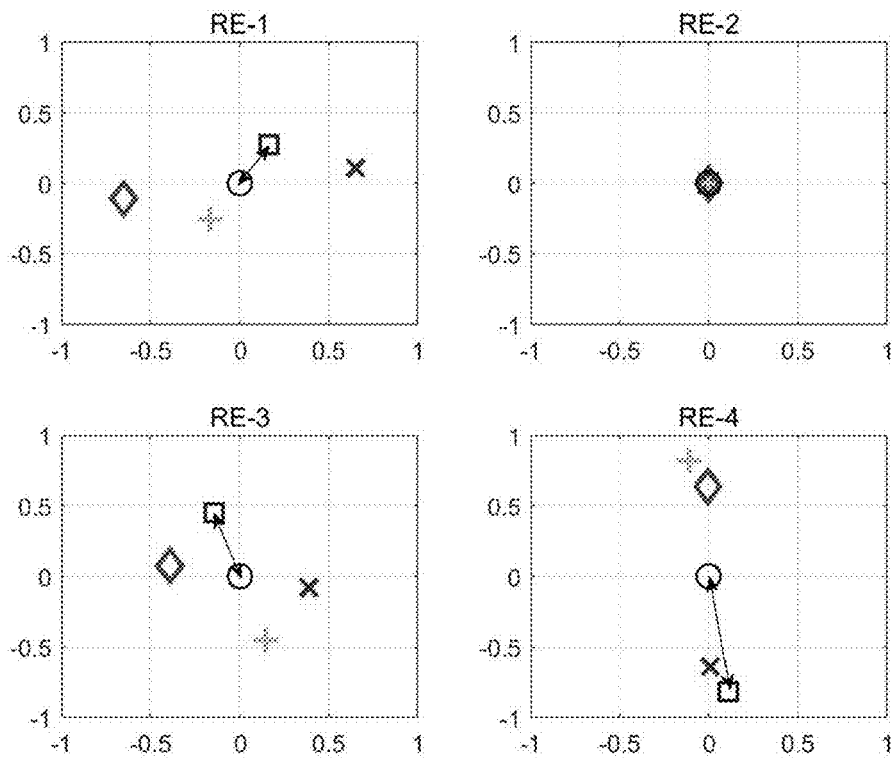
FIG. 19 shows a schematic diagram of constellation point mapping of the MA signature pool.

The foregoing FIGS. 11-18 show MA signature pools obtained by the method according to the embodiment of the present disclosure in the form of a codebook list. In another example, the MA signature pools shown above, especially the non-linear bit-to-symbol mappings, may also be represented in the form of a constellation diagram. FIG. 19 shows a schematic diagram of constellation point mapping of one codebook on 4 REs when the total number of UEs is 6, 4 REs are used to transmit 2-bit data, and activation probabilities of the 6 UEs are all 0.5. In FIG. 19, a corresponding modulation order M is 4, and different shapes on each RE represent positions of constellation points mapped by different data (including 4 sets of bit sequences (0,0), (0,1), (1,0), (1,1)). For example, when the transmitted 2-bit data is (0, 0), positions of constellation points mapped respectively on the 4 REs may be represented by squares; and when the transmitted 2-bit data is (0, 1), positions of constellation points mapped respectively on the 4 REs may be represented by diamonds. That is, the constellation diagram in FIG. 19 may correspond to a mapping manner of one codebook of the MA signature pool in FIG. 14 on 4 REs.

Figure 20:
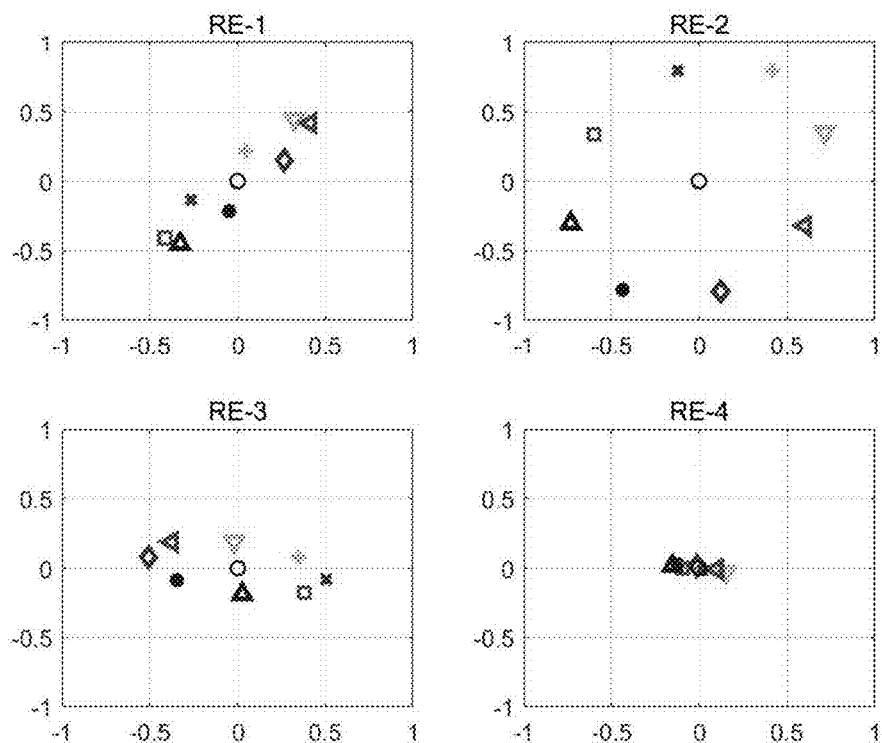
FIG. 20 shows a schematic diagram of constellation point mapping of the MA signature pool.

FIG. 20 shows a schematic diagram of constellation point mapping of one codebook on 4 REs when the total number of UEs is 6, 4 REs are used to transmit 3-bit data, and activation probabilities of the 6 UEs are all 0.5. In FIG. 20, a corresponding modulation order M is 8, and different shapes on each RE represent positions of constellation points mapped by different data (including 8 sets of bit sequences formed by 3 bits). For example, when the transmitted 3-bit data is (0, 0, 1), positions of constellation points mapped respectively on the 4 REs may be represented by inverted triangles; and when the transmitted 3-bit data is (1, 0, 1), positions of constellation points mapped respectively on the 4 REs may be represented by plus signs. That is, the constellation diagram in FIG. 20 may correspond to a mapping manner of one codebook of the MA signature pool in FIG. 17 on 4 REs.

Figure 21:
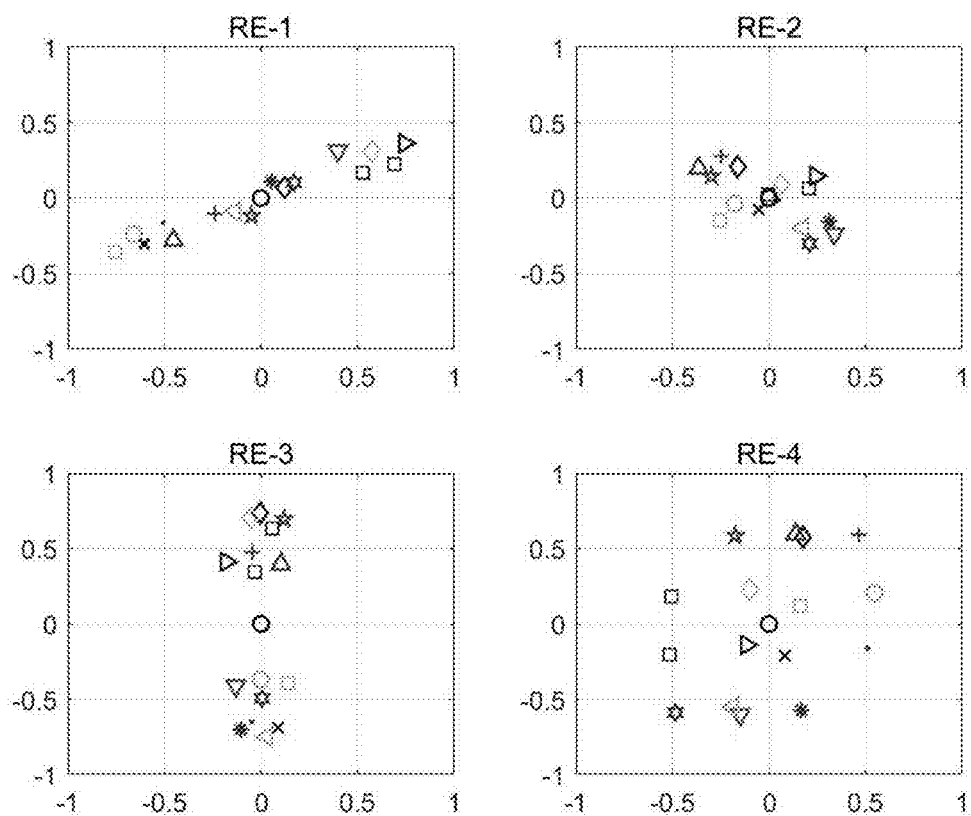
FIG. 21 shows a schematic diagram of constellation point mapping of the MA signature pool.

FIG. 21 shows a schematic diagram of constellation point mapping of one codebook on 4 REs when the total number of UEs is 6, 4 REs are used to transmit 4-bit data, and activation probabilities of the 6 UEs are all 0.5. In FIG. 21, a corresponding modulation order M is 16, and different shapes on each RE represent positions of constellation points mapped by different data (including 16 sets of bit sequences formed by 4 bits). For example, when the transmitted 4-bit data is (0, 0, 1, 1), positions of constellation points mapped respectively on the 4 REs may be represented by five-pointed stars; and when the transmitted 4-bit data is (1, 0, 1, 0), positions of constellation points mapped respectively on the 4 REs may be represented by positive triangles. That is, the constellation diagram in FIG. 21 may correspond to a mapping manner of one codebook of the MA signature pool in FIG. 18 on 4 REs.

Figure 22A:
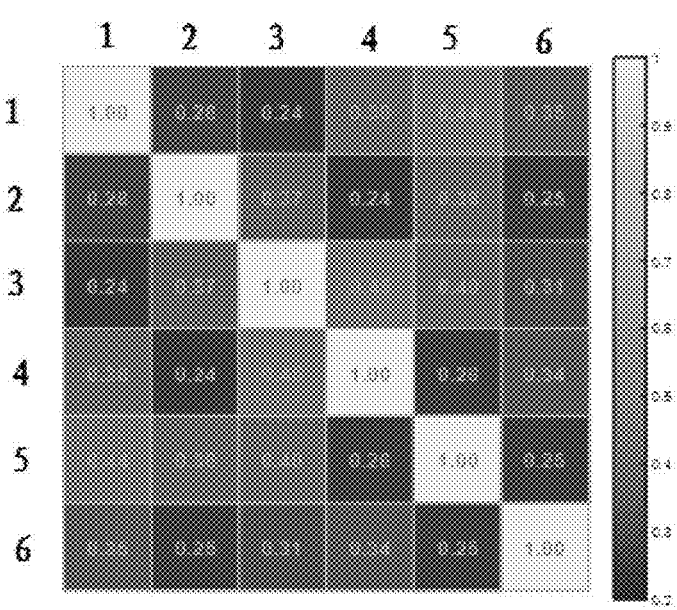
FIG. 22A shows a schematic diagram of cross-correlation between respective MA signatures in an MA signature pool (or MA signature groups therein) obtained by a WBE (Welch-Bound Equality) quantification algorithm for grant-based transmission.
Figure 22B:
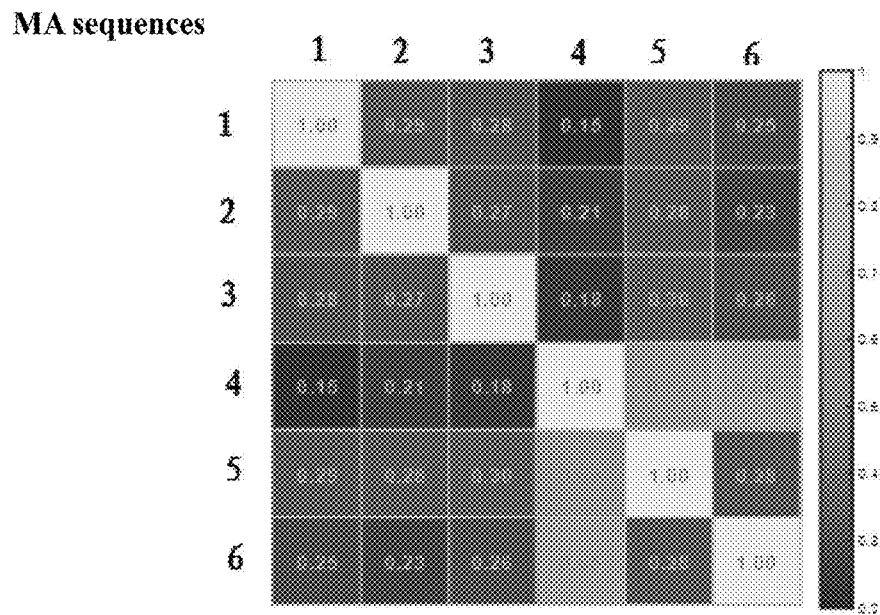
FIG. 22B shows a schematic diagram of cross-correlation between respective MA signatures in an MA signature pool obtained according to an embodiment of the present disclosure.

FIGS. 22A-22B show comparison results of an MA signature acquisition method of grant-based transmission and the MA signature acquisition method according to an embodiment of the present disclosure. In the scenario shown in FIGS. 22A-22B, the total number of UEs in the cell is 6, activation probabilities of 3 UEs is 0.8, activation probabilities of 3 UEs is 0.4. FIG. 22A shows a schematic diagram of cross-correlation between respective MA signatures in an MA signature pool composed of 6 MA signatures obtained by a WBE quantization algorithm for grant-based transmission. As shown in FIG. 22A, cross-correlation between the same MA signatures is shown as 1 (e.g., cross-correlation between MA signature 1 and MA signature 1 is 1), and a cross-correlation level between different MA signatures obtained according to the WBE quantification algorithm is roughly the same. For example, cross-correlation between MA signature 2 and MA signature 4 is 0.24, and cross-correlation between MA signature 4 and MA signature 5 is 0.26. Cross-correlation between different MA signatures is roughly within a range of 0.2 to 0.4, and there is no significant difference. FIG. 22B shows a schematic diagram of cross-correlation between respective MA signatures in an MA signature pool composed of 6 MA signatures obtained according to an embodiment of the present disclosure. As shown in FIG. 22B, cross-correlation between the same MA signatures is also shown as 1 (e.g., cross-correlation between MA signature 1 and MA signature 1 is 1), and a cross-correlation level between different MA signatures obtained according to the embodiment of the present disclosure is quite different. For example, cross-correlation between MA signature 2 and MA signature 3 is 0.27, and cross-correlation between MA signature 4 and MA signature 5 is 0.59. When MA signatures shown in FIG. 22B are corresponding to UEs, the MA signatures in the MA signature pool may be grouped according to different activation probabilities of the UEs. For example, MA signatures 1-3 with relatively low cross-correlation may be assigned to 3 UEs with a high activation probability (0.8), and MA signatures 4-6 with relatively high cross-correlation may be assigned to 3 UEs with a low activation probability (0.4), thereby reducing interference of data transmission between UEs, increase accuracy of symbol detection, and improve the performance of the wireless communication system.

The method according to the embodiment of the present disclosure can consider UE activation information reflecting UE activation characteristics in grant-free transmission to provide MA signatures suitable for grant-free transmission, thereby reducing interference of data transmission between UEs, increasing accuracy of symbol detection and improving the performance of the wireless communication system.

Figure 23:
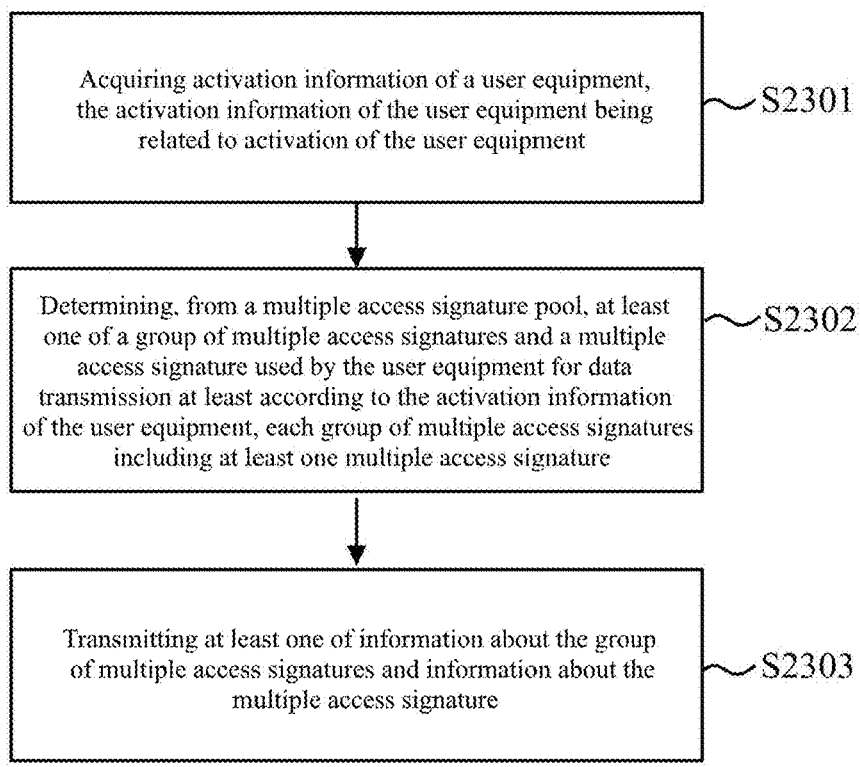
FIG. 23 shows a flow chart of a method executed by a base station according to an embodiment of the present disclosure.

FIG. 23 shows a flowchart of a method 2300 executed by a base station according to an embodiment of the present disclosure.

As shown in FIG. 23, in step S2301, activation information of a user equipment is acquired, and the activation information of the user equipment is related to activation of the user equipment.

Optionally, the activation information of the user equipment may be an activation probability of the user equipment. For example, it may be assumed that the time axis is divided into multiple time units, and a probability that the UE has data arriving (there is data to be transmitted) in a certain time unit is defined as the activation probability of the UE. As another example, for a certain physical resource block that may perform uplink data transmission, a probability that the UE performs uplink data transmission on this physical resource block may be defined as the activation probability of the UE. In an example, the activation probability of the UE may be any value within the interval [0, 1], for example, the activation probability of the UE may be 25%.

Optionally, the activation information of the user equipment may also be an activation mode of the user equipment. In an example, the UE may have a periodic mode with an average transmission period T, and accordingly, a relationship with the activation probability of the UE may be obtained indirectly, which, for example, may be expressed as 1/T. In another example, the UE may have an activation mode of Poisson arrival mode. Specifically, a probability density function in the Poisson arrival model is expressed as: a probability distribution of the number of events that occur within the interval [t, t+τ]:

$$P[(N(t+\tau) - N(t)) = k] = \frac{e^{-\lambda\tau}(\lambda\tau)^k}{k!} \quad k = 0, 1, \ldots$$

where P[A] represents a probability of occurrence of event A, t represents time, N(t) represents the number of events that have occurred as of time t, τ is a parameter representing time, and k represents the number of events (the value may be 0 or other positive integers) that have occurred, λ is a positive number and is called the arrival rate. When T is 1, the above formula may be used to express the probability distribution of the number of events occurred per unit time. It can be seen that a probability of no event occurring (i.e., let k=0) may be expressed as exp(−λ); and correspondingly, the activation probability of this UE, that is, the probability of occurrence of events may be obtained indirectly, which, for example, may be expressed as 1−exp(−λ).

According to an embodiment of the present disclosure, the activation information of the UE may be acquired by the UE or by the base station. Optionally, the UE may acquire the activation information of the user equipment according to at least one of historical activation information and high layer activation information. The historical activation information indicates information related to historical activation behaviors of the user equipment, such as, for example, an average activation probability or an average transmission period of the UE within a certain period of preset time. The high layer activation information may be information related to the activation of the user equipment notified by a high layer. In an example, it may be business transmission information of the UE acquired by the UE through a service layer (application layer), for example, an average period or frequency acquired by the UE at which one or more applications (apps) need perform business transmission. Optionally, the base station may also acquire activation information of a certain user equipment according to at least one of historical activation information and high layer activation information. The historical activation information indicates information related to historical activation behaviors of the user equipment, such as, for example, an average activation probability or an average transmission period of the UE within a certain period of preset time. The high layer activation information may also be information related to the activation of the user equipment notified by a high layer, for example, business transmission information of the UE acquired by the base station through a service layer (application layer). When the base station acquires the activation information of the UE, the acquisition may be actively performed, or triggered by an indication signal transmitted by the UE indicating the base station to estimate the activation information of the UE, which is not limited herein.

After acquiring the activation information of the UE by the UE or the base station, the activation information of the UE may be transmitted by using signaling. In one implementation, the UE may acquire the activation information and transmit it to the base station. In an example, the UE may explicitly transmit the activation information via, for example, a Physical Uplink Shared Channel (PUSCH). Optionally, the UE may explicitly transmit a quantized bit value of the activation information through pre-appointed Radio Resource Control (RRC) signaling, MAC CEs, specific bit positions in a data report, etc. For example, the UE may use bit "11001" to transmit the activation probability of 25%. As another example, the UE may use bit "0" to represent the "Poisson arrival mode" and "111" to indicate that the parameter λ therein is 4; and use bit "1" to represent the "periodic mode" and "110" to indicate that its average transmission period T is 3. In other words, when the UE transmits "0111" in a specific bit position of PUSCH, it may be used to indicate that its activation information is the Poisson arrival mode with the parameter λ of 4.

In another example, the UE may also use a preset activation mode and its corresponding index value to implicitly transmit the activation information via a Physical Random Access Channel (PRACH), a Physical Uplink Control Channel (PUCCH), a Sounding Reference Signal (SRS) or the like. For example, when transmitting the UE activation probability, the index value of 1 may be specified as the activation probability [0, 1/3], the index value of 2 may be specified as the activation probability [1/3, 2/3], and the index value of 3 may be specified as [2/3, 1]. Therefore, when the UE transmits the index value through, for example, Msg.1 of PRACH or PUCCH, it may indicate a corresponding range of the UE activation probability. Alternatively, the UE may also transmit a respective index value and a corresponding activation probability by a specific configuration of SRS in sequences or resources. As another example, when transmitting the UE activation mode and its corresponding parameters, different index values may also be selected to correspond to different activation modes and parameters, and these index values may be transmitted via PRACHs, PUCCHs, or SRSs.

In addition, the UE may also transmit, for example, a 1-bit indication signal at a specific bit position via PRACH, PUCCH or the like, to indicate the base station to estimate the activation information of the UE. When receiving this indication signal, the base station may obtain the activation information of the UE according to at least one of the historical activation information and the high layer activation information, and transmit it to the UE during downlink transmission. When the base station informs the UE of its activation information, the specific explicit or implicit representation is similar to the representation on the UE side, which will not be repeatedly described herein.

In step 2302, at least one of the group of multiple access signatures and the multiple access signature used by the user equipment for data transmission is determined from the multiple access signature pool at least according to the activation information of the user equipment, and each group of multiple access signatures includes at least one multiple access signature.

In this step, the multiple access pool may include at least two multiple access signatures. Multiple access signatures in the multiple access signature pool may be acquired in a plurality of ways. In one example, the multiple access signatures in the multiple access signature pool may be constructed by using a deep learning algorithm, for example, may be constructed offline with a neural network by using the deep learning algorithm. Optionally, the multiple access signatures may be constructed based on an error rate of symbol detection and an error rate of detection for the user equipment's activation state. For example, the multiple access signature may be constructed by minimizing a weighted sum of the error rate of symbol detection and the error rate of detection for the user equipment's activation state. Multiple access signatures constructed by using the deep learning algorithm may include at least one of bit-to-symbol mappings and spreading sequences.

In the specific construction process using the deep learning algorithm, optionally, a neural network structure may be designed by using the deep learning algorithm to parameterize a variational function in a variational optimization problem, so as to acquire the multiple signature based on the activation information of the user equipment by introducing the error rate of symbol detection and the error rate of detection for the user equipment's activation state. The variational optimization problem P1 intended to reduce an error rate of detection (which may include symbol detection and detection of user equipment's activation state) in grant-free transmission may be expressed as:

$$P1: \min_{\theta, \phi} E_{p(x)}[L(\theta, \phi | x)]$$

where the above variational optimization problem P1 represents that $E_{p(x)}[L(\theta, \phi|x)]$ is minimized by changing θ and ϕ; each element in the vector $x=[x_1, \ldots x_n, \ldots x_N]$ represents a source signal of each of N UEs (when it is 0, meaning that this UE is not activated); E means to average L(θ, φ|x) in the case where x is made to satisfy the distribution of p(x), and L(θ, φ|x) may be specifically expressed as:

$$L(\theta, \phi \mid x) = E_{q_\phi(\tilde{s}\mid x)}[\log p_\theta(x \mid \tilde{s})] - KL(q_\phi(\tilde{s}\mid x) \parallel p_\theta(\tilde{s}))$$

where $E_{q_\phi(\tilde{s}\mid x)}[\log p_\theta(x\mid\tilde{s})]$ means to average $\log p_\theta(x\mid\tilde{s})$ in the case that x is given such that $\tilde{s}$ satisfies the distribution $q_\phi(\tilde{s}\mid x)$; $KL(q_\phi(\tilde{s}\mid x) \parallel p_\theta(\tilde{s}))$ represents a KL divergence (Kullback-Leibler Divergence) between $q_\phi(\tilde{s}\mid x)$ and $p_\theta(\tilde{s})$; L(θ, φ|x) represents a function determined by θ and φ for a given x; $q_\phi(\tilde{s}\mid x)$ in the formula represents an encoder, and φ is an adjustable parameter of the encoder; $p_\theta(x\mid\tilde{s})$ is a decoder, and θ is an adjustable parameter of the decoder; $p_\theta(\tilde{s})$ is a prior distribution of $\tilde{s}$, which is usually set as Gaussian distribution. $\tilde{s}$ may indicate a bit-to-symbol mapping, and when the result is a linear extension, it may indicate a linear spreading sequence. When $\tilde{s}$ is obtained and after all possible values of the source signal $x_n$ are traversed, a set of $\tilde{s}$ may be obtained, which is the corresponding multiple access signature pool.

In order to solve the above variational optimization problem P1, a deep learning algorithm may be used to introduce a neural network (for example, Deep Neural Network, DNN) to parameterize the above encoder $q_\phi(\tilde{s}\mid x)$ and/or decoder $p_\theta(x\mid\tilde{s})$, respectively, and obtain φ in the encoder $q_\phi(\tilde{s}\mid x)$ and/or θ in the decoder $p_\theta(x\mid\tilde{s})$, respectively. Optionally, the above neural network may be trained based on at least one of the error rate of symbol detection and the error rate of detection for the user equipment's activation state. For example, the total loss function L of the neural network may be expressed as:

$$\tilde{L} = \gamma_A \tilde{L}^A + \gamma_B \tilde{L}^B$$

where $\tilde{L}^A$ represents the error rate of symbol detection, for example, it may be the error rate of symbol detection by the base station; $\tilde{L}^B$ represents the error rate of detection for the user equipment's activation state; $\gamma_A$ and $\gamma_B$ are corresponding weights of $\tilde{L}^A$ and $\tilde{L}^B$, respectively, which may be a value between 0-1, for example. In other words, the total loss function $\tilde{L}$ of the neural network may be expressed as a weighted sum of the error rate of symbol detection and the error rate of detection for the user equipment's activation state.

When the above total loss function is introduced to train and optimize the neural network, the neural network may be trained by, for example, a gradient descent method, to obtain corresponding values of θ and/or φ. For example, N sub-neural networks corresponding to N UEs may be used to parameterize $q_\phi(\tilde{s}\mid x)$. Let the n-th sub-neural network $f_{n,W_{f_n}}(x_n)$ be:

$$f_{n,W_{f_n}}(x_n) = \tilde{f}_{n,W_{f_n}}(x_n) - \tilde{f}_{n,W_{f_n}}(0)$$

where $\tilde{f}_{n,W_{f_n}}(x_n)$ is a typical fully-connected deep neural network with an input $x_n$ and a neural network parameter $W_{f_n}$. Outputs of the N sub-networks are added together to obtain a composite symbol sequence as:

$$f_{W_f}(x) = \sum_{n=1}^{N} \sqrt{P_n}\, diag(h_n) f_{n,W_{f_n}}(x_n), \text{ where } W_f = \{W_{f_1}...W_{f_N}\}.$$

where $P_n$ is a transmission power of the n-th user, $diag(h_n)$ is a diagonal matrix, and diagonal elements are channel parameters of the n-th UE.

Subsequently, $q_\phi(\tilde{s}\mid x)$ may be approximated as a probability encoder as shown below:

$$q_\phi(\tilde{s}\mid x) \leftarrow \mathcal{N}(\tilde{s} \mid f_{W_f}(x), \sigma_0^2 I)$$

where N is a Gaussian distribution function, $f_{W_f}(x)$ is an mean value of the Gaussian distribution, and $\sigma_0^2 I$ is a Gaussian distribution variance, where $\sigma_0^2$ is a noise variance, and I is a unit matrix.

According to the above formula, a value range of φ may be equivalent to a value range of the neural network parameter $W_f$.

After obtaining the training result of the neural network, the bit-to-symbol mapping (or the linear spreading sequence) $f_{n,W_{f_n}}(x_n)$, that is, $\tilde{s}$, may be obtained by the value of θ and/or φ, as well as the corresponding multiple access signature pool.

FIG. 6 shows an example of a multiple access signature pool constructed by the above deep learning algorithm. As shown in FIG. 6, the multiple access signature pool may be divided into a plurality of groups of multiple access signatures, and the groups of multiple access signatures may respectively correspond to a total number N of user equipment in the cell and activation probabilities of the user equipment. The number N of user equipment and the activation probabilities of the user equipment are both related to p(x), and may be used to generate a specific form of p(x), thereby obtaining a specific form of $q_\phi(\tilde{s}\mid x)$, and further obtaining the bit-to-symbol mapping or the spreading sequence $\tilde{s}$. In FIG. 6, for example, when the number N of UEs is 6, and there is only a UE activation probability-1, it may correspond to a multiple access signature group-1; when the number N of UEs is 20, and there is a UE activation probability-1 and a UE activation probability-2, it may correspond to a multiple access signature group-9, and the multiple access signature group-9 may include a subgroup 1 corresponding to a high activation probability and a subgroup 2 corresponding to a low activation probability. That is, if there are a total of 6 UEs in the cell, and activation probabilities of all UEs are UE activation probability-1 (e.g., 75%), it may correspond to the multiple access signature group-1 in the multiple access signature pool. If there are a total of 20 UEs in the cell, and activation probabilities of a part of (such as, 12) UEs are UE activation probability-1 (e.g., 75%), while activation probabilities of another part of UEs (such as, 8) are UE activation probability-2 (e.g., 50%), it may correspond to the multiple access signature group-9 in the multiple access signature pool, and the multiple access signature group-9 may include a subgroup 1 corresponding to 12 UEs with a high activation probability (e.g., 75%) and a subgroup 2 corresponding to 8 UEs with a low activation probability (e.g., 50%). When subsequently determining an MA signature corresponding to a certain UE according to the MA signature pool and/or MA signature groups, the specific correspondence of MA signatures (groups) that takes into account UE activation probabilities and the number of UEs in the cell as shown in FIG. 6 may be used to select the corresponding MA signature to improve the performance of the wireless communication system. The representation of the MA signature pool as shown in FIG. 6 and the correspondence of MA signature groups with the number of UEs, UE activation probabilities are only an example. In practical applications, any correspondence of MA signature groups and related parameters may be used, but are not limited to the number of UEs and UE activation probabilities herein. In addition, the correspondence between MA signature groups and parameters may also be arbitrary. In an example, a certain MA signature group may correspond to one or more value ranges of a certain parameter, rather than only a certain value of the parameter. For example, UE activation probability-1 may be an activation probability ranging from 50% to 75%, and correspond to a high activation probability; UE activation probability-2 may be an activation probability ranging from 25% to 50%, and correspond to a low activation probability.

The specific implementation of constructing MA signatures as well as obtaining the MA signature pool and MA signature groups by using a deep learning algorithm are described above in detail, and the correspondence between MA signature groups in the MA signature pool and related parameters (such as the number of UEs, UE activation probabilities) and the selection method are listed above. In another example, at least a part of multiple access signatures in the multiple access signature pool may also be acquired based on another multiple access signature pool, where the another multiple access signature pool may be a known multiple access signature pool, for example, may be a multiple access signature pool obtained according to multiple access signatures of grant-based transmission. In an example, the at least a part of the MA signature pool acquired from the another MA signature pool may be expressed as $S=\{s_1, s_2 \ldots s_N\}$, where each element represents one MA signature, and the MA signature pool may be used for N UEs, but of course it is not limited thereto.

After obtaining the MA signature pool according to any of the above methods, a MA signature corresponding to a UE may be obtained from the MA signature pool according to activation information of the user equipment. The activation information of the user equipment is related to activation of the user equipment. As described above, the activation information of the user equipment may be an activation probability of the user equipment, and may also be an activation mode of the user equipment. In an example, the UE may have a periodic mode with an average transmission period T, and accordingly, the relationship with the activation probability of the UE may be obtained indirectly, which, for example, may be expressed as 1/T. In another example, the UE may have an activation mode of Poisson arrival mode.

The specific operation of acquiring the MA signature or the MA signature group from the MA signature pool according to the activation information of the UE may be performed by the base station. When the MA signature pool is constructed by a deep learning algorithm, optionally, MA signature groups in the MA signature pool may correspond to the number of UEs and UE activation information (UE activation probabilities or corresponding UE activation modes and related parameters). In this example, the base station may obtain a corresponding MA signature group from the MA signature pool according to the total number of UEs in the cell and/or UE activation information, and may subsequently acquire the MA signature that can be used by this UE from the MA signature group by using, for example, random selection or other selection methods, such as, a method of minimizing a collision probability of MA signatures between UEs. Alternatively, the UE may also select the MA signature for use from the MA signature pool or one or more MA signature groups according to the UE activation information by, for example, a random selection method, or further by using the UE activation information.

When the MA signature pool is obtained from another MA signature pool and is expressed as $S=\{s_1, s_2 \ldots s_N\}$, the UE or the base station may obtain a correspondence between UEs and MA signatures in the MA signature pool by solving the following optimization problem, to obtain the MA signature used by the UE. The optimization problem is:

$$\min_{\pi} E_{P(I)}\left[\sum_{i \in I} \sum_{j \neq i, j \in I} |s^*_{\pi(i)} s_{\pi(j)}|\right]$$

where E means to average $\sum_{i \in I}\sum_{j \neq i,j \in I}|s^*_{\pi(i)}s_{\pi(j)}|$ in the case where the total number of UEs is N, and the activated UE group I satisfies the distribution p(I); π(i) is a sequence mapping function, that is, the $s_{\pi(i)}$-th sequence is mapped to the i-th UE; $s^*_{\pi(i)}$ is the conjugate transpose of $s_{\pi(i)}$; $s^*_{\pi(i)} s_{\pi(j)}$ represents correlation (interference) between the i-th UE and the j-th UE when the i-th UE is interfered by the j-th UE. It can be seen that by solving the above optimization problem, the MA signature obtained from another MA signature pool (such as a known MA signature pool) may correspond to UEs, and interference between activated UEs may be minimized, thereby further improving the performance of the wireless communication system. Therefore, the method of the embodiment of the present disclosure can not only reduce interference of data transmission between UEs by constructing new MA signatures, but also can reduce the interference and increase accuracy of symbol detection by re-adjusting the correspondence between known MA signatures and UEs.

In step S2303, at least one of information about the group of multiple access signatures and information about the multiple access signature is transmitted.

According to an embodiment of the present disclosure, if the MA signature or the MA signature group used by the UE is determined by the base station, the base station needs to notify the UE through downlink transmission, so that the UE can use the selected MA signature, or further select the MA signature for data transmission in the selected MA signature group. Optionally, the MA signature pool, MA signature groups contained therein, and relevant UE activation parameters corresponding to the MA signature groups may be pre-stored on both sides of the UE and the base station; or, optionally, may be pre-configured to the UE by the base station through broadcast signaling such as System Information Blocks (SIBs)/Master Information Blocks (MIBs). Subsequently, the base station may transmit its selected MA signature group and/or MA signature to the UE through RRC signaling for static configuration or L1 layer signaling for semi-dynamic configuration (e.g., Downlink Control Information (DCI)). For example, the base station may use index 1 to indicate an index of the selected MA signature group, and use index 2 to indicate an index of the MA signature in this MA signature group. In the example of the MA signature pool shown in FIG. 6, the base station may transmit index 6 to indicate the MA signature group-6, and transmit index 2 to indicate the second MA signature in the MA signature group-6 at the same time through RRC signaling. Of course, in another example, the base station may also directly inform the UE of the selected MA signature.

Optionally, when the base station transmits the selected MA signature, it can also inform the UE in an implicit manner. In an example, the base station may quantify the selected MA signature into an M-QAM constellation diagram representation, and inform the UE of the result through corresponding signaling. In another example, the base station can also inform the UE of a corresponding constellation model and related parameter values of the selected MA signature. For example, if the MA signature has a parallelogram shape, the base station may inform the UE that the UE constellation diagram is a parallelogram by a pre-appointed related position or bit value, and subsequently inform the UE of the two side lengths of the parallelogram and the angle between them.

In the various grant-free transmission processes shown in FIGS. 2 to 4, when the aforementioned transmission of UE activation information and acquisition of MA signatures are taken into consideration, there may be a corresponding updated signaling interaction process between the UE and the base station. According to an embodiment of the present disclosure, the UE may firstly acquire the activation information of the user equipment; then, the UE transmits the activation information of the user equipment to the base station, so that the base station determines the multiple access signature from the multiple access signature pool according to the activation information of the user equipment; finally, the UE receives information about the multiple access signature indicating the multiple access signature determined by the base station to acquire the multiple access signature. Alternatively, according to another embodiment of the present disclosure, the UE may firstly transmit, to the base station, an indication signal indicating the base station to estimate the activation information of the user equipment, so that the base station estimates the activation information of the UE; then, the UE receives, from the base station, the multiple access signature determined from the multiple access signature pool according to an estimation result of the activation information of the user equipment.

FIG. 7 shows an implementation process of grant-free transmission according to an embodiment of the present disclosure. As shown in FIG. 7, on the basis that the base station configures data transmission resources to the UE and realizes grant-free transmission through RRC signaling as shown in the above FIG. 2, before receiving RRC signaling, the UE may firstly transmit via PRACH the activation information of the UE or an indication signal used to indicate the base station to estimate the activation information of the UE to the base station, so that the base station selects the MA signature used by the UE from the MA signature pool according to the activation information of the UE or an estimation result. Then, the base station may transmit information about the MA signature through RRC signaling, so that the UE transmits uplink data by using the MA signature.

FIG. 8 shows an implementation process of grant-free transmission according to an embodiment of the present disclosure. As shown in FIG. 8, on the basis that the base station configures data transmission resources to the UE and realizes grant-free transmission through RRC signaling and L1 signaling as shown in the above FIG. 3, before receiving RRC signaling and L1 signaling, the UE may firstly transmit via PRACH the activation information of the UE or an indication signal used to indicate the base station to estimate the activation information of the UE to the base station, so that the base station selects the MA signature used by the UE from the MA signature pool according to the activation information of the UE or an estimation result. Then, the base station may transmit information about the MA signature through RRC signaling and L1 signaling, so that the UE transmits uplink data by using the MA signature.

FIG. 9 shows an implementation process of grant-free transmission according to an embodiment of the present disclosure. As shown in FIG. 8, on the basis that the base station configures data transmission resources to the UE and realizes grant-free transmission through RRC signaling and L1 signaling as shown in the above FIG. 3, after receiving RRC signaling and L1 signaling, the UE may transmit via uplink data the activation information of the UE or an indication signal used to indicate the base station to estimate the activation information of the UE to the base station, so that the base station selects the MA signature used by the UE from the MA signature pool according to the activation information of the UE or an estimation result. Then, the base station may transmit information about the MA signature through RRC signaling and L1 signaling, so that the UE transmits uplink data by using the updated MA signature during the next uplink data transmission.

According to another embodiment of the present disclosure, the UE may firstly acquire the activation information of the user equipment; and the UE may acquire the multiple access signature determined from the multiple access signature pool according to the activation information. In one example, the UE may acquire its own activation information. In another example, the UE may also transmit an indication signal to the base station indicating the base station to estimate the activation information of the user equipment, so that the base station estimates the activation information of the UE; then, the UE may receive the estimated activation information of the UE from the base station.

In addition, optionally, the UE may not only acquire the activation information of the user equipment, but also receive information about a group of multiple access signatures transmitted by the base station; then, the UE may determine the multiple access signature according to the activation information of the user equipment and the information about the group of multiple access signatures. The information about the group of multiple access signatures may be determined by the base station itself, or may be determined by estimating the activation information of the UE upon the base station is triggered by the indication information of the UE. FIG. 10 shows an implementation process of grant-free transmission according to an embodiment of the present disclosure. As shown in FIG. 10, based on the implementation process of the contention-based grant-free transmission shown in the previous FIG. 4, the base station may firstly transmit information about one or more MA signature groups via Physical Broadcast Channels (PBCHs), the UE then selects the MA signature for use from the MA signature group transmitted by the base station according to its activation information. Optionally, in the representation of the MA signature pool shown in FIG. 6, for example, when the base station knows the number of UEs in its corresponding cell and the UEs' activation information, it may select one of the MA signature groups for transmission to the UE; when the base station knows only one of the number of UEs in its corresponding cell and the UE's activation information, it may select one column or row of MA signature groups in FIG. 6 for transmission to the UE; when the base station knows neither of the number of UEs in the corresponding cell and the UEs' activation information, it may transmit the entire MA signature pool to the UE for the UE to select from. Optionally, the UE may further select an appropriate MA signature from the MA signature group according to the activation information; or, the UE may randomly select an MA signature from the MA signature group, which is not limited herein. After acquiring the MA signature, the UE may use the MA signature to process data and transmit the processed data.

The method according to the embodiment of the present disclosure can consider UE activation information reflecting UE activation characteristics in grant-free transmission to provide MA signatures suitable for grant-free transmission, thereby reducing interference of data transmission between UEs, increasing accuracy of symbol detection and improving the performance of the wireless communication system.

A user equipment according to an embodiment of the present application will be described below with reference to FIG. 24. The user equipment may execute the above-mentioned method executed by a user equipment. Since operations of the user equipment are basically the same as the steps of the method described above, only a brief description is provided herein, and repeated descriptions of the same content are omitted.

Figure 24:
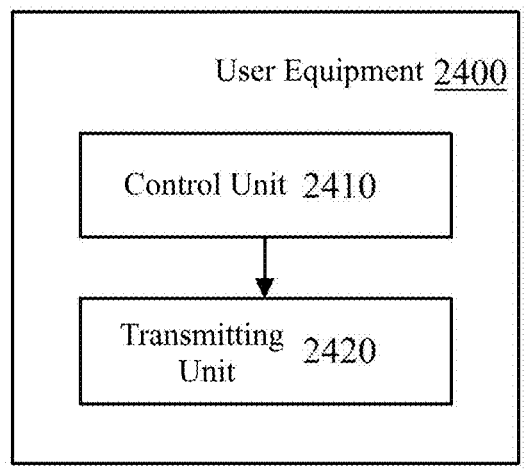
FIG. 24 shows a structural block diagram of a user equipment according to an embodiment of the present disclosure.

As shown in FIG. 24, the user equipment 2400 includes a control unit 2410 and a transmitting unit 2420. It should be appreciated that FIG. 24 only shows components related to the embodiments of the present application, while other components are omitted, but this is only illustrative, and the user equipment 2400 may include other components as required.

The control unit 2410 acquires a multiple access signature. The multiple access signature is determined from a multiple access signature pool according to activation information of the user equipment, and the activation information of the user equipment is related to activation of the user equipment.

The multiple access pool may include at least two multiple access signatures. Multiple access signatures in the multiple access signature pool may be acquired in a plurality of ways. In one example, the multiple access signatures in the multiple access signature pool may be constructed by using a deep learning algorithm, for example, may be constructed offline with a neural network by using the deep learning algorithm. Optionally, the multiple access signatures may be constructed based on an error rate of symbol detection and an error rate of detection for the user equipment's activation state. For example, the multiple access signature may be constructed by minimizing a weighted sum of the error rate of symbol detection and the error rate of detection for the user equipment's activation state. The multiple access signatures constructed by using the deep learning algorithm may include at least one of bit-to-symbol mappings and spreading sequences.

In the specific construction process using the deep learning algorithm, optionally, a neural network structure may be designed by using the deep learning algorithm to parameterize a variational function in a variational optimization problem, so as to acquire the multiple signature based on the activation information of the user equipment by introducing the error rate of symbol detection and the error rate of detection for the user equipment's activation state. The variational optimization problem P1 intended to reduce an error rate of detection (which may include symbol detection and detection of user equipment's activation state) in grant-free transmission may be expressed as:

$$P1: \min_{\theta,\phi} E_{p(x)}[L(\theta, \phi \mid x)]$$

where the above variational optimization problem P1 represents that $E_{p(x)}[L(\theta, \phi|x)]$ is minimized by changing $\theta$ and $\phi$; each element in the vector $x=[x_1, \ldots x_n, \ldots x_N]$ represents a source signal of each of N UEs (when it is 0, meaning that this UE is not activated); E means to average $L(\theta, \phi|x)$ in the case where x is made to satisfy the distribution of $p(x)$, and $L(\theta, \phi \mid x)$ may be specifically expressed as:

$$L(\theta, \phi \mid x) = E_{q_\phi(\tilde{s}|x)}[\log p_\theta(x \mid \tilde{s})] - KL(q_\phi(\tilde{s} \mid x) \| p_\theta(\tilde{s}))$$

where $E_{q_\phi(\tilde{s}|x)}[\log p_\theta(x|\tilde{s})]$ means to average $\log p_\theta(x|\tilde{s})$ in the case that x is given such that $\tilde{s}$ satisfies the distribution $q_\phi(\tilde{s}|x)$; $KL(q_\phi(\tilde{s}|x)\|p_\theta(\tilde{s}))$ represents a KL divergence (Kullback-Leibler Divergence) between $q_\phi(\tilde{s}|x)$ and $p_\theta(\tilde{s})$; $L(\theta, \phi|x)$ represents a function determined by $\theta$ and $\phi$ for a given x; $q_\phi(\tilde{s}|x)$ in the formula represents an encoder, and $\phi$ is an adjustable parameter of the encoder; $p_\theta(x|\tilde{s})$ is a decoder, and $\theta$ is an adjustable parameter of the decoder; $p_\theta(\tilde{s})$ is a prior distribution of $\tilde{s}$, which is usually set as Gaussian distribution. $\tilde{s}$ may indicate a bit-to-symbol mapping, and when the result is a linear extension, it may indicate a linear spreading sequence. When $\tilde{s}$ is obtained and after all possible values of the source signal $x_n$ are traversed, a set of $\tilde{s}$ may be obtained, which is the corresponding multiple access signature pool.

In order to solve the above variational optimization problem P1, a deep learning algorithm may be used to introduce a neural network (for example, Deep Neural Network, DNN) to parameterize the above encoder $q_\phi(\tilde{s}|x)$ and/or decoder $p_\theta(x|\tilde{s})$, respectively, and obtain $\phi$ in the encoder $q_\phi(\tilde{s}|x)$ and/or $\theta$ in the decoder $p_\theta(x|\tilde{s})$, respectively. Optionally, the above neural network may be trained based on at least one of the error rate of symbol detection and the error rate of detection for the user equipment's activation state. For example, the total loss function $\tilde{L}$ of the neural network may be expressed as:

$$\tilde{L} = \gamma_A \tilde{L}^A + \gamma_B \tilde{L}^B$$

where $\tilde{L}^A$ represents the error rate of symbol detection, for example, it may be the error rate of symbol detection by the base station; $\tilde{L}^B$ represents the error rate of detection for the user equipment's activation state; $\gamma_A$ and $\gamma_B$ are corresponding weights of $\tilde{L}^A$ and $\tilde{L}^B$, respectively, which may be a value between 0-1, for example. In other words, the total loss function $\tilde{L}$ of the neural network may be expressed as a weighted sum of the error rate of symbol detection and the error rate of detection for the user equipment's activation state.

When the above total loss function is introduced to train and optimize the neural network, the neural network may be trained by, for example, a gradient descent method, to obtain corresponding values of $\theta$ and/or $\phi$. For example, N sub-neural networks corresponding to N UEs may be used to parameterize $q_\phi(\tilde{s}|x)$. Let the n-th sub-neural network $f_{n,W_{fn}}(x_n)$ be:

$$f_{n,W_{fn}}(x_n) = \tilde{f}_{n,W_{fn}}(x_n) - \bar{\tilde{f}}_{n,W_{fn}} \qquad (0)$$

where $\tilde{f}_{n,W_{f_n}}(x_n)$ is a typical fully-connected deep neural network with an input $x_n$ and a neural network parameter $W_{f_n}$. Outputs of the N sub-networks are added together to obtain a composite symbol sequence as:

$$f_{W_f}(x) = \sum_{n=1}^{N} \sqrt{P_n}\, diag(h_n) f_{n,W_{f_n}}(x_n), \text{ where } W_f = \{W_{f_1}...W_{f_N}\}.$$

where $P_n$ is a transmission power of the n-th user, $diag(h_n)$ is a diagonal matrix, and diagonal elements are channel parameters of the n-th UE.

Subsequently, $q_\phi(\tilde{s}|x)$ may be approximated as a probability encoder as shown below:

$$q_\phi(\tilde{s}|x) \leftarrow \mathcal{N}(\tilde{s} \mid f_{W_f}(x), \sigma_0^2 I)$$

where N is a Gaussian distribution function, $f_{W_f}(x)$ is an mean value of the Gaussian distribution, and $\sigma_0^2 I$ is a Gaussian distribution variance, where $\sigma_0^2$ is a noise variance, and I is a unit matrix.

According to the above formula, a value range of $\phi$ may be equivalent to a value range of the neural network parameter $W_f$.

After obtaining the training result of the neural network, the bit-to-symbol mapping (or the linear spreading sequence) $f_{n,W_{f_n}}(x_n)$, that is, $\tilde{s}$, may be obtained by the value of $\theta$ and/or $\phi$, as well as the corresponding multiple access signature pool.

FIG. 6 shows an example of a multiple access signature pool constructed by the above deep learning algorithm. As shown in FIG. 6, the multiple access signature pool may be divided into a plurality of groups of multiple access signatures, and the groups of multiple access signatures may respectively correspond to a total number N of user equipment in the cell and activation probabilities of the user equipment. The number N of user equipment and the activation probabilities of the user equipment are both related to p(x), and may be used to generate a specific form of p(x), thereby obtaining a specific form of $q_\phi(\tilde{s}|x)$, and further obtaining the bit-to-symbol mapping or the spreading sequence $\tilde{s}$. In FIG. 6, for example, when the number N of UEs is 6, and there is only a UE activation probability-1, it may correspond to a multiple access signature group-1; when the number N of UEs is 20, and there is a UE activation probability-1 and a UE activation probability-2, it may correspond to a multiple access signature group-9, and the multiple access signature group-9 may include a subgroup 1 corresponding to a high activation probability and a subgroup 2 corresponding to a low activation probability. That is, if there are a total of 6 UEs in the cell, and activation probabilities of all UEs are UE activation probability-1 (e.g., 75%), it may correspond to the multiple access signature group-1 in the multiple access signature pool. If there are a total of 20 UEs in the cell, and activation probabilities of a part of (such as, 12) UEs are UE activation probability-1 (e.g., 75%), while activation probabilities of another part of UEs (such as, 8) are UE activation probability-2 (e.g., 50%), it may correspond to the multiple access signature group-9 in the multiple access signature pool, and the multiple access signature group-9 may include a subgroup 1 corresponding to 12 UEs with a high activation probability (e.g., 75%) and a subgroup 2 corresponding to 8 UEs with a low activation probability (e.g., 50%). When subsequently determining an MA signature corresponding to a certain UE according to the MA signature pool and/or MA signature groups, the specific correspondence of MA signatures (groups) that takes into account UE activation probabilities and the number of UEs in the cell as shown in FIG. 6 may be used to select the corresponding MA signature to improve the performance of the wireless communication system. The representation of the MA signature pool as shown in FIG. 6 and the correspondence of MA signature groups with the number of UEs, UE activation probabilities are only an example. In practical applications, any correspondence of MA signature groups and related parameters may be used, but are not limited to the number of UEs and UE activation probabilities herein. In addition, the correspondence between MA signature groups and parameters may also be arbitrary. In an example, a certain MA signature group may correspond to one or more value ranges of a certain parameter, rather than only a certain value of the parameter. For example, UE activation probability-1 may be an activation probability ranging from 50% to 75%, and correspond to a high activation probability; UE activation probability-2 may be an activation probability ranging from 25% to 50%, and correspond to a low activation probability.

The specific implementation of constructing MA signatures as well as obtaining the MA signature pool and MA signature groups by using a deep learning algorithm are described above in detail, and the correspondence between MA signature groups in the MA signature pool and related parameters (such as the number of UEs, UE activation probabilities) and the selection method are listed above. In another example, at least a part of multiple access signatures in the multiple access signature pool may also be acquired based on another multiple access signature pool, where the another multiple access signature pool may be a known multiple access signature pool, for example, may be a multiple access signature pool obtained according to multiple access signatures of grant-based transmission. In an example, the at least a part of the MA signature pool acquired from the another MA signature pool may be expressed as $S=\{s_1, s_2 \ldots s_N\}$, where each element represents one MA signature, and the MA signature pool may be used for N UEs, but of course it is not limited thereto.

After obtaining the MA signature pool according to any of the above methods, a MA signature corresponding to a UE may be obtained from the MA signature pool according to activation information of the user equipment. The activation information of the user equipment is related to activation of the user equipment. Optionally, the activation information of the user equipment may be an activation probability of the user equipment. For example, it may be assumed that the time axis is divided into multiple time units, and a probability that the UE has data arriving (there is data to be transmitted) in a certain time unit is defined as the activation probability of the UE. As another example, for a certain physical resource block that may perform uplink data transmission, a probability that the UE performs uplink data transmission on this physical resource block may be defined as the activation probability of the UE. In an example, the activation probability of the UE may be any value within the interval [0, 1], for example, the activation probability of the UE may be 25%.

Optionally, the activation information of the user equipment may also be an activation mode of the user equipment. In an example, the UE may have a periodic mode with an average transmission period T, and accordingly, a relationship with the activation probability of the UE may be obtained indirectly, which, for example, may be expressed as 1/T. In another example, the UE may have an activation mode of Poisson arrival mode. Specifically, a probability density function in the Poisson arrival model is expressed as: a probability distribution of the number of events that occur within the interval [t, t+τ]:

$$P[(N(t+\tau) - N(t)) = k] = \frac{e^{-\lambda\tau}(\lambda\tau)^k}{k!} \quad k = 0, 1, \ldots$$

where P[A] represents a probability of occurrence of event A, t represents time, N(t) represents the number of events that have occurred as of time t, τ is a parameter representing time, and k represents the number of events (the value may be 0 or other positive integers) that have occurred, λ is a positive number and is called the arrival rate. When τ is 1, the above formula may be used to express the probability distribution of the number of events occurred per unit time. It can be seen that a probability of no event occurring (i.e., let k=0) may be expressed as exp(−λ); and correspondingly, the activation probability of this UE, that is, the probability of occurrence of events may be obtained indirectly, which, for example, may be expressed as 1−exp(−λ).

According to an embodiment of the present disclosure, the activation information of the UE may be acquired by the UE or by the base station. Optionally, the UE may acquire the activation information of the user equipment according to at least one of historical activation information and high layer activation information. The historical activation information indicates information related to historical activation behaviors of the user equipment, such as, for example, an average activation probability or an average transmission period of the UE within a certain period of preset time. The high layer activation information may be information related to the activation of the user equipment notified by a high layer. In an example, it may be business transmission information of the UE acquired by the UE through a service layer (application layer), for example, an average period or frequency acquired by the UE at which one or more applications (apps) need perform business transmission. Optionally, the base station may also acquire activation information of a certain user equipment according to at least one of historical activation information and high layer activation information. The historical activation information indicates information related to historical activation behaviors of the user equipment, such as, for example, an average activation probability or an average transmission period of the UE within a certain period of preset time. The high layer activation information may also be information related to the activation of the user equipment notified by a high layer, for example, business transmission information of the UE acquired by the base station through a service layer (application layer). When the base station acquires the activation information of the UE, the acquisition may be actively performed, or triggered by an indication signal transmitted by the UE indicating the base station to estimate the activation information of the UE, which is not limited herein.

After acquiring the activation information of the UE by the UE or the base station, the activation information of the UE may be transmitted by using signaling. In one implementation, the UE may acquire the activation information and transmit it to the base station. In an example, the UE may explicitly transmit the activation information via, for example, a Physical Uplink Shared Channel (PUSCH). Optionally, the UE may explicitly transmit a quantized bit value of the activation information through pre-appointed Radio Resource Control (RRC) signaling, MAC CEs, specific bit positions in a data report, etc. For example, the UE may use bit "11001" to transmit the activation probability of 25%. As another example, the UE may use bit "0" to represent the "Poisson arrival mode" and "111" to indicate that the parameter λ therein is 4; and use bit "1" to represent the "periodic mode" and "110" to indicate that its average transmission period τ is 3. In other words, when the UE transmits "0111" in a specific bit position of PUSCH, it may be used to indicate that its activation information is the Poisson arrival mode with the parameter λ of 4.

In another example, the UE may also use a preset activation mode and its corresponding index value to implicitly transmit the activation information via a Physical Random Access Channel (PRACH), a Physical Uplink Control Channel (PUCCH), a Sounding Reference Signal (SRS) or the like. For example, when transmitting the UE activation probability, the index value of 1 may be specified as the activation probability [0, 1/3], the index value of 2 may be specified as the activation probability [1/3, 2/3], and the index value of 3 may be specified as [2/3, 1]. Therefore, when the UE transmits the index value through, for example, Msg.1 of PRACH or PUCCH, it may indicate a corresponding range of the UE activation probability. Alternatively, the UE may also transmit a respective index value and a corresponding activation probability by a specific configuration of SRS in sequences or resources. As another example, when transmitting the UE activation mode and its corresponding parameters, different index values may also be selected to correspond to different activation modes and parameters, and these index values may be transmitted via PRACHs, PUCCHs, or SRSs.

In addition, the UE may also transmit, for example, a 1-bit indication signal at a specific bit position via PRACH, PUCCH or the like, to indicate the base station to estimate the activation information of the UE. When receiving this indication signal, the base station may obtain the activation information of the UE according to at least one of the historical activation information and the high layer activation information, and transmit it to the UE during downlink transmission. When the base station informs the UE of its activation information, the specific explicit or implicit representation is similar to the representation on the UE side, which will not be repeatedly described herein.

The specific operation of acquiring the MA signature from the MA signature pool according to the activation information of the UE may be performed by the UE or by the base station. When the MA signature pool is constructed by a deep learning algorithm, optionally, MA signature groups in the MA signature pool may correspond to the number of UEs and UE activation information (UE activation probabilities or corresponding UE activation modes and related parameters). In this example, the base station may obtain a corresponding MA signature group from the MA signature pool according to the total number of UEs in the cell and/or UE activation information, and may subsequently acquire the MA signature that can be used by this UE from the MA signature group by using, for example, random selection or other selection methods, such as, a method of minimizing a collision probability of MA signatures between UEs. Alternatively, the UE may also select the MA signature for use from the MA signature pool or one or more MA signature groups according to the UE activation information by, for example, a random selection method, or further by using the UE activation information.

When the MA signature pool is obtained from another MA signature pool and is expressed as S={$s_1, s_2, \ldots s_N$}, the UE or the base station may obtain a correspondence between UEs and MA signatures in the MA signature pool by solving the following optimization problem, to obtain the MA signature used by the UE. The optimization problem is:

$$\min_{\pi} E_{P(I)}\left[\sum_{i\in I}\sum_{j\neq i, j\in I} |s^*_{\pi(i)} s_{\pi(j)}|\right]$$

where E means to average $\Sigma_{i\in I}\Sigma_{j\neq i, j\neq I}|s^*_{\pi(i)} s_{\pi(j)}|$ in the case where the total number of UEs is N, and the activated UE group I satisfies the distribution p(I); π(i) is a sequence mapping function, that is, the $s_{\pi(i)}$-th sequence is mapped to the i-th UE; $s^*_{\pi(i)}$ is the conjugate transpose of $s_{\pi(i)}$; $s^*_{\pi(i)} s_{\pi(j)}$ represents correlation (interference) between the i-th UE and the j-th UE when the i-th UE is interfered by the j-th UE. It can be seen that by solving the above optimization problem, the MA signature obtained from another MA signature pool (such as a known MA signature pool) may correspond to UEs, and interference between activated UEs may be minimized, thereby further improving the performance of the wireless communication system. Therefore, the method of the embodiment of the present disclosure can not only reduce interference of data transmission between UEs by constructing new MA signatures, but also can reduce the interference and increase accuracy of symbol detection by re-adjusting the correspondence between known MA signatures and UEs.

According to an embodiment of the present disclosure, if the MA signature used by the UE is acquired by the UE itself, the UE may directly use the MA signature to transmit data in the subsequent steps. According to another embodiment of the present disclosure, if the MA signature or MA signature group used by the UE is determined by the base station, the base station needs to notify the UE through downlink transmission, so that the UE can use the selected MA signature, or further select the MA signature for data transmission in the selected MA signature group. Optionally, the MA signature pool, MA signature groups contained therein, and relevant UE activation parameters corresponding to the MA signature groups may be pre-stored on both sides of the UE and the base station; or, optionally, may be pre-configured to the UE by the base station through broadcast signaling such as System Information Blocks (SIBs)/Master Information Blocks (MIBs). Subsequently, the base station may transmit its selected MA signature group and/or MA signature to the UE through RRC signaling for static configuration or L1 layer signaling for semi-dynamic configuration (e.g., Downlink Control Information (DCI)). For example, the base station may use index 1 to indicate an index of the selected MA signature group, and use index 2 to indicate an index of the MA signature in this MA signature group. In the example of the MA signature pool shown in FIG. 6, the base station may transmit index 6 to indicate the MA signature group-6, and transmit index 2 to indicate the second MA signature in the MA signature group-6 at the same time through RRC signaling. Of course, in another example, the base station may also directly inform the UE of the selected MA signature.

Optionally, when the base station transmits the selected MA signature, it can also inform the UE in an implicit manner. In an example, the base station may quantify the selected MA signature into an M-QAM constellation diagram representation, and inform the UE of the result through corresponding signaling. In another example, the base station can also inform the UE of a corresponding constellation model and related parameter values of the selected MA signature. For example, if the MA signature has a parallelogram shape, the base station may inform the UE that the UE constellation diagram is a parallelogram by a pre-appointed related position or bit value, and subsequently inform the UE of the two side lengths of the parallelogram and the angle between them.

In the various grant-free transmission processes shown in FIGS. 2 to 4, when the aforementioned transmission of UE activation information and acquisition of MA signatures are taken into consideration, there may be a corresponding updated signaling interaction process between the UE and the base station. According to an embodiment of the present disclosure, the UE may firstly acquire the activation information of the user equipment; then, the UE transmits the activation information of the user equipment to the base station, so that the base station determines the multiple access signature from the multiple access signature pool according to the activation information of the user equipment; finally, the UE receives information about the multiple access signature indicating the multiple access signature determined by the base station to acquire the multiple access signature. Alternatively, according to another embodiment of the present disclosure, the UE may firstly transmit, to the base station, an indication signal indicating the base station to estimate the activation information of the user equipment, so that the base station estimates the activation information of the UE; then, the UE receives, from the base station, the multiple access signature determined from the multiple access signature pool according to an estimation result of the activation information of the user equipment.

FIG. 7 shows an implementation process of grant-free transmission according to an embodiment of the present disclosure. As shown in FIG. 7, on the basis that the base station configures data transmission resources to the UE and realizes grant-free transmission through RRC signaling as shown in the above FIG. 2, before receiving RRC signaling, the UE may firstly transmit via PRACH the activation information of the UE or an indication signal used to indicate the base station to estimate the activation information of the UE to the base station, so that the base station selects the MA signature used by the UE from the MA signature pool according to the activation information of the UE or an estimation result. Then, the base station may transmit information about the MA signature through RRC signaling, so that the UE transmits uplink data by using the MA signature.

FIG. 8 shows an implementation process of grant-free transmission according to an embodiment of the present disclosure. As shown in FIG. 8, on the basis that the base station configures data transmission resources to the UE and realizes grant-free transmission through RRC signaling and L1 signaling as shown in the above FIG. 3, before receiving RRC signaling and L1 signaling, the UE may firstly transmit via PRACH the activation information of the UE or an indication signal used to indicate the base station to estimate the activation information of the UE to the base station, so that the base station selects the MA signature used by the UE from the MA signature pool according to the activation information of the UE or an estimation result. Then, the base station may transmit information about the MA signature through RRC signaling and L1 signaling, so that the UE transmits uplink data by using the MA signature.

FIG. 9 shows an implementation process of grant-free transmission according to an embodiment of the present disclosure. As shown in FIG. 8, on the basis that the base station configures data transmission resources to the UE and realizes grant-free transmission through RRC signaling and L1 signaling as shown in the above FIG. 3, after receiving RRC signaling and L1 signaling, the UE may transmit via uplink data the activation information of the UE or an indication signal used to indicate the base station to estimate the activation information of the UE to the base station, so that the base station selects the MA signature used by the UE from the MA signature pool according to the activation information of the UE or an estimation result. Then, the base station may transmit information about the MA signature through RRC signaling and L1 signaling, so that the UE transmits uplink data by using the updated MA signature during the next uplink data transmission.

According to another embodiment of the present disclosure, the UE may firstly acquire the activation information of the user equipment; and the UE may acquire the multiple access signature determined from the multiple access signature pool according to the activation information. In one example, the UE may acquire its own activation information. In another example, the UE may also transmit an indication signal to the base station indicating the base station to estimate the activation information of the user equipment, so that the base station estimates the activation information of the UE; then, the UE may receive the estimated activation information of the UE from the base station.

In addition, optionally, the UE may not only acquire the activation information of the user equipment, but also receive information about a group of multiple access signatures transmitted by the base station; then, the UE may determine the multiple access signature according to the activation information of the user equipment and the information about the group of multiple access signatures. The information about the group of multiple access signatures may be determined by the base station itself, or may be determined by estimating the activation information of the UE upon the base station is triggered by the indication information of the UE. FIG. 10 shows an implementation process of grant-free transmission according to an embodiment of the present disclosure. As shown in FIG. 10, based on the implementation process of the contention-based grant-free transmission shown in the previous FIG. 4, the base station may firstly transmit information about one or more MA signature groups via Physical Broadcast Channels (PBCHs), the UE then selects the MA signature for use from the MA signature group transmitted by the base station according to its activation information. Optionally, in the representation of the MA signature pool shown in FIG. 6, for example, when the base station knows the number of UEs in its corresponding cell and the UEs' activation information, it may select one of the MA signature groups for transmission to the UE; when the base station knows only one of the number of UEs in its corresponding cell and the UE's activation information, it may select one column or row of MA signature groups in FIG. 6 for transmission to the UE; when the base station knows neither of the number of UEs in the corresponding cell and the UEs' activation information, it may transmit the entire MA signature pool to the UE for the UE to select from. Optionally, the UE may further select an appropriate MA signature from the MA signature group according to the activation information; or, the UE may randomly select an MA signature from the MA signature group, which is not limited herein.

The transmitting unit 2420 transmits data by using the multiple access signature.

The transmitting unit 2420 may use the previously acquired MA signature, to process the data to be transmitted based on the MA signature, and transmit the processed data.

The user equipment according to the embodiment of the present disclosure can consider UE activation information reflecting UE activation characteristics in grant-free transmission to provide MA signatures suitable for grant-free transmission, thereby reducing interference of data transmission between UEs, increasing accuracy of symbol detection and improving the performance of the wireless communication system.

A base station according to an embodiment of the present application will be described below with reference to FIG. 25. The base station may execute the above-mentioned method executed by a base station. Since operations of the base station are basically the same as the steps of the method described above, only a brief description is provided herein, and repeated descriptions of the same content are omitted.

Figure 25:
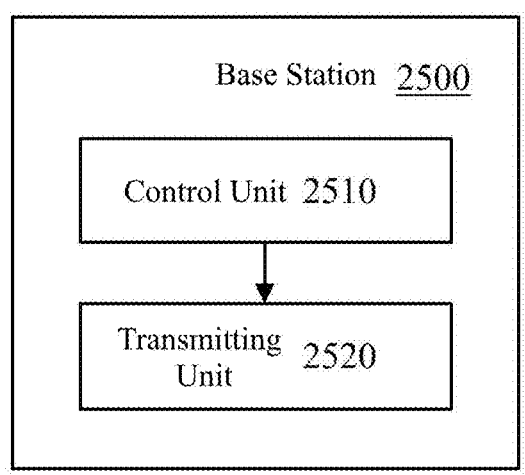
FIG. 25 shows a structural block diagram of a base station according to an embodiment of the present disclosure.

As shown in FIG. 25, the base station 2500 includes a control unit 2510 and a transmitting unit 2520. It should be appreciated that FIG. 25 only shows components related to the embodiments of the present application, while other components are omitted, but this is only illustrative, and the base station 2500 may include other components as required.

The control unit 2510 acquires activation information of a user equipment, and the activation information of the user equipment is related to activation of the user equipment.

Optionally, the activation information of the user equipment may be an activation probability of the user equipment. For example, it may be assumed that the time axis is divided into multiple time units, and a probability that the UE has data arriving (there is data to be transmitted) in a certain time unit is defined as the activation probability of the UE. As another example, for a certain physical resource block that may perform uplink data transmission, a probability that the UE performs uplink data transmission on this physical resource block may be defined as the activation probability of the UE. In an example, the activation probability of the UE may be any value within the interval [0, 1], for example, the activation probability of the UE may be 25%.

Optionally, the activation information of the user equipment may also be an activation mode of the user equipment. In an example, the UE may have a periodic mode with an average transmission period T, and accordingly, a relationship with the activation probability of the UE may be obtained indirectly, which, for example, may be expressed as 1/T. In another example, the UE may have an activation mode of Poisson arrival mode. Specifically, a probability density function in the Poisson arrival model is expressed as: a probability distribution of the number of events that occur within the interval [t, t+τ]:

$$P[(N(t+\tau) - N(t)) = k] = \frac{e^{-\lambda\tau}(\lambda\tau)^k}{k!} \quad k = 0, 1, \ldots$$

where P[A] represents a probability of occurrence of event A, t represents time, N(t) represents the number of events that have occurred as of time t, τ is a parameter representing time, and k represents the number of events (the value may be 0 or other positive integers) that have occurred, λ is a positive number and is called the arrival rate. When τ is 1, the above formula may be used to express the probability distribution of the number of events occurred per unit time. It can be seen that a probability of no event occurring (i.e., let k=0) may be expressed as exp(-λ); and correspondingly, the activation probability of this UE, that is, the probability of occurrence of events may be obtained indirectly, which, for example, may be expressed as 1−exp(-λ).

According to an embodiment of the present disclosure, the activation information of the UE may be acquired by the UE or by the base station. Optionally, the UE may acquire the activation information of the user equipment according to at least one of historical activation information and high layer activation information. The historical activation information indicates information related to historical activation behaviors of the user equipment, such as, for example, an average activation probability or an average transmission period of the UE within a certain period of preset time. The high layer activation information may be information related to the activation of the user equipment notified by a high layer. In an example, it may be business transmission information of the UE acquired by the UE through a service layer (application layer), for example, an average period or frequency acquired by the UE at which one or more applications (apps) need perform business transmission. Optionally, the base station may also acquire activation information of a certain user equipment according to at least one of historical activation information and high layer activation information. The historical activation information indicates information related to historical activation behaviors of the user equipment, such as, for example, an average activation probability or an average transmission period of the UE within a certain period of preset time. The high layer activation information may also be information related to the activation of the user equipment notified by a high layer, for example, business transmission information of the UE acquired by the base station through a service layer (application layer). When the base station acquires the activation information of the UE, the acquisition may be actively performed, or triggered by an indication signal transmitted by the UE indicating the base station to estimate the activation information of the UE, which is not limited herein.

After acquiring the activation information of the UE by the UE or the base station, the activation information of the UE may be transmitted by using signaling. In one implementation, the UE may acquire the activation information and transmit it to the base station. In an example, the UE may explicitly transmit the activation information via, for example, a Physical Uplink Shared Channel (PUSCH). Optionally, the UE may explicitly transmit a quantized bit value of the activation information through pre-appointed Radio Resource Control (RRC) signaling, MAC CEs, specific bit positions in a data report, etc. For example, the UE may use bit "11001" to transmit the activation probability of 25%. As another example, the UE may use bit "0" to represent the "Poisson arrival mode" and "111" to indicate that the parameter λ therein is 4; and use bit "1" to represent the "periodic mode" and "110" to indicate that its average transmission period τ is 3. In other words, when the UE transmits "0111" in a specific bit position of PUSCH, it may be used to indicate that its activation information is the Poisson arrival mode with the parameter λ of 4.

In another example, the UE may also use a preset activation mode and its corresponding index value to implicitly transmit the activation information via a Physical Random Access Channel (PRACH), a Physical Uplink Control Channel (PUCCH), a Sounding Reference Signal (SRS) or the like. For example, when transmitting the UE activation probability, the index value of 1 may be specified as the activation probability [0, 1/3], the index value of 2 may be specified as the activation probability [1/3, 2/3], and the index value of 3 may be specified as [2/3, 1]. Therefore, when the UE transmits the index value through, for example, Msg.1 of PRACH or PUCCH, it may indicate a corresponding range of the UE activation probability. Alternatively, the UE may also transmit a respective index value and a corresponding activation probability by a specific configuration of SRS in sequences or resources. As another example, when transmitting the UE activation mode and its corresponding parameters, different index values may also be selected to correspond to different activation modes and parameters, and these index values may be transmitted via PRACHs, PUCCHs, or SRSs.

In addition, the UE may also transmit, for example, a 1-bit indication signal at a specific bit position via PRACH, PUCCH or the like, to indicate the base station to estimate the activation information of the UE. When receiving this indication signal, the base station may obtain the activation information of the UE according to at least one of the historical activation information and the high layer activation information, and transmit it to the UE during downlink transmission. When the base station informs the UE of its activation information, the specific explicit or implicit representation is similar to the representation on the UE side, which will not be repeatedly described herein.

The control unit 2510 determines at least one of the group of multiple access signatures and the multiple access signature used by the user equipment for data transmission from the multiple access signature pool at least according to the activation information of the user equipment, and each group of multiple access signatures includes at least one multiple access signature.

In this step, the multiple access pool may include at least two multiple access signatures. Multiple access signatures in the multiple access signature pool may be acquired in a plurality of ways. In one example, the multiple access signatures in the multiple access signature pool may be constructed by using a deep learning algorithm, for example, may be constructed offline with a neural network by using the deep learning algorithm. Optionally, the multiple access signatures may be constructed based on an error rate of symbol detection and an error rate of detection for the user equipment's activation state. For example, the multiple access signature may be constructed by minimizing a weighted sum of the error rate of symbol detection and the error rate of detection for the user equipment's activation state. Multiple access signatures constructed by using the deep learning algorithm may include at least one of bit-to-symbol mappings and spreading sequences.

In the specific construction process using the deep learning algorithm, optionally, a neural network structure may be designed by using the deep learning algorithm to parameterize a variational function in a variational optimization problem, so as to acquire the multiple signature based on the activation information of the user equipment by introducing the error rate of symbol detection and the error rate of detection for the user equipment's activation state. The variational optimization problem P1 intended to reduce an error rate of detection (which may include symbol detection and detection of user equipment's activation state) in grant-free transmission may be expressed as:

$$P1 : \min_{\theta,\phi} E_{p(x)}[L(\theta, \phi | x)]$$

where the above variational optimization problem P1 represents that $E_{p(x)}[L(\theta, \phi|x)]$ is minimized by changing θ and φ; each element in the vector x=[$x_1, \ldots x_n, \ldots x_N$] represents a source signal of each of N UEs (when it is 0, meaning that this UE is not activated); E means to average L(θ, φ|x) in the case where x is made to satisfy the distribution of p(x), and L(θ, φ|x) may be specifically expressed as:

$$L(\theta, \phi \mid x) = E_{q_\phi(\tilde{s}\mid x)}[\log p_\theta(x \mid \tilde{s})] - KL(q_\phi(\tilde{s} \mid x) \| p_\theta(\tilde{s}))$$

where $E_{q_\phi(\tilde{s}\mid x)}$[log $p_\theta$(x|$\tilde{s}$)] means to average log $p_\theta$(x|$\tilde{s}$) in the case that x is given such that $\tilde{s}$ satisfies the distribution $q_\phi$($\tilde{s}$|x); KL($q_\phi$($\tilde{s}$|x)∥$p_\theta$($\tilde{s}$)) represents a KL divergence (Kullback-Leibler Divergence) between $q_\phi$($\tilde{s}$|x) and $p_\theta$($\tilde{s}$); L(θ, φ|x) represents a function determined by θ and φ for a given x; $q_\phi$($\tilde{s}$|x) in the formula represents an encoder, and φ is an adjustable parameter of the encoder; $p_\theta$(x|$\tilde{s}$) is a decoder, and θ is an adjustable parameter of the decoder; $p_\theta$($\tilde{s}$) is a prior distribution of $\tilde{s}$, which is usually set as Gaussian distribution. $\tilde{s}$ may indicate a bit-to-symbol mapping, and when the result is a linear extension, it may indicate a linear spreading sequence. When $\tilde{s}$ is obtained and after all possible values of the source signal $x_n$ are traversed, a set of $\tilde{s}$ may be obtained, which is the corresponding multiple access signature pool.

In order to solve the above variational optimization problem P1, a deep learning algorithm may be used to introduce a neural network (for example, Deep Neural Network, DNN) to parameterize the above encoder $q_\phi$($\tilde{s}$|x) and/or decoder $p_\theta$(x|$\tilde{s}$), respectively, and obtain φ in the encoder $q_\phi$($\tilde{s}$|x) and/or θ in the decoder $p_\theta$(x|$\tilde{s}$), respectively. Optionally, the above neural network may be trained based on at least one of the error rate of symbol detection and the error rate of detection for the user equipment's activation state. For example, the total loss function $\tilde{L}$ of the neural network may be expressed as:

$$\tilde{L} = \gamma_A \tilde{L}^A + \gamma_B \tilde{L}^B$$

where $\tilde{L}^A$ represents the error rate of symbol detection, for example, it may be the error rate of symbol detection by the base station; $\tilde{L}^B$ represents the error rate of detection for the user equipment's activation state; $\gamma_A$ and $\gamma_B$ are corresponding weights of $\tilde{L}^A$ and $\tilde{L}^B$, respectively, which may be a value between 0-1, for example. In other words, the total loss function $\tilde{L}$ of the neural network may be expressed as a weighted sum of the error rate of symbol detection and the error rate of detection for the user equipment's activation state.

When the above total loss function is introduced to train and optimize the neural network, the neural network may be trained by, for example, a gradient descent method, to obtain corresponding values of θ and/or φ. For example, N sub-neural networks corresponding to N UEs may be used to parameterize $q_\phi$($\tilde{s}$|x). Let the n-th sub-neural network $f_{n,W_{f_n}}$($x_n$) be:

$$f_{n,W_{f_n}}(x_n) = \tilde{f}_{n,W_{f_n}}(x_n) - \tilde{f}_{n,W_{f_n}}(0)$$

where $f_{n,W_{f_n}}$($x_n$) is a typical fully-connected deep neural network with an input $x_n$ and a neural network parameter $W_{f_n}$. Outputs of the N sub-networks are added together to obtain a composite symbol sequence as:

$$f_{W_f}(x) = \sum_{n=1}^{N} \sqrt{P_n} \, \text{diag}(h_n) f_{n,W_{f_n}}(x_n),$$

where $$W_f = \{W_{f_1} \ldots W_{f_N}\}.$$

where $P_n$ is a transmission power of the n-th user, diag($h_n$) is a diagonal matrix, and diagonal elements are channel parameters of the n-th UE.

Subsequently, $q_\varnothing$($\tilde{s}$|x) may be approximated as a probability encoder as shown below:

$$q_\phi(\tilde{s} \mid x) \leftarrow \mathcal{N}(\tilde{s} \mid f_{W_f}(x), \sigma_0^2 I)$$

where N is a Gaussian distribution function, $f_{W_f}$(x) is an mean value of the Gaussian distribution, and $\sigma_0^2 I$ is a Gaussian distribution variance, where $\sigma_0^2$ is a noise variance, and I is a unit matrix.

According to the above formula, a value range of φ may be equivalent to a value range of the neural network parameter $W_f$.

After obtaining the training result of the neural network, the bit-to-symbol mapping (or the linear spreading sequence) $f_{n,W_{f_n}}$($x_n$), that is, $\tilde{s}$, may be obtained by the value of θ and/or φ, as well as the corresponding multiple access signature pool.

FIG. 6 shows an example of a multiple access signature pool constructed by the above deep learning algorithm. As shown in FIG. 6, the multiple access signature pool may be divided into a plurality of groups of multiple access signatures, and the groups of multiple access signatures may respectively correspond to a total number N of user equipment in the cell and activation probabilities of the user equipment. The number N of user equipment and the activation probabilities of the user equipment are both related to p(x), and may be used to generate a specific form of p(x), thereby obtaining a specific form of $q_\phi$($\tilde{s}$|x), and further obtaining the bit-to-symbol mapping or the spreading sequence $\tilde{s}$. In FIG. 6, for example, when the number N of UEs is 6, and there is only a UE activation probability-1, it may correspond to a multiple access signature group-1; when the number N of UEs is 20, and there is a UE activation probability-1 and a UE activation probability-2, it may correspond to a multiple access signature group-9, and the multiple access signature group-9 may include a subgroup 1 corresponding to a high activation probability and a subgroup 2 corresponding to a low activation probability. That is, if there are a total of 6 UEs in the cell, and activation probabilities of all UEs are UE activation probability-1 (e.g., 75%), it may correspond to the multiple access signature group-1 in the multiple access signature pool. If there are a total of 20 UEs in the cell, and activation probabilities of a part of (such as, 12) UEs are UE activation probability-1 (e.g., 75%), while activation probabilities of another part of UEs (such as, 8) are UE activation probability-2 (e.g., 50%), it may correspond to the multiple access signature group-9 in the multiple access signature pool, and the multiple access signature group-9 may include a subgroup 1 corresponding to 12 UEs with a high activation probability (e.g., 75%) and a subgroup 2 corresponding to 8 UEs with a low activation probability (e.g., 50%). When subsequently determining an MA signature corresponding to a certain UE according to the MA signature pool and/or MA signature groups, the specific correspondence of MA signatures (groups) that takes into account UE activation probabilities and the number of UEs in the cell as shown in FIG. 6 may be used to select the corresponding MA signature to improve the performance of the wireless communication system. The representation of the MA signature pool as shown in FIG. 6 and the correspondence of MA signature groups with the number of UEs, UE activation probabilities are only an example. In practical applications, any correspondence of MA signature groups and related parameters may be used, but are not limited to the number of UEs and UE activation probabilities herein. In addition, the correspondence between MA signature groups and parameters may also be arbitrary. In an example, a certain MA signature group may correspond to one or more value ranges of a certain parameter, rather than only a certain value of the parameter. For example, UE activation probability-1 may be an activation probability ranging from 50% to 75%, and correspond to a high activation probability; UE activation probability-2 may be an activation probability ranging from 25% to 50%, and correspond to a low activation probability.

The specific implementation of constructing MA signatures as well as obtaining the MA signature pool and MA signature groups by using a deep learning algorithm are described above in detail, and the correspondence between MA signature groups in the MA signature pool and related parameters (such as the number of UEs, UE activation probabilities) and the selection method are listed above. In another example, at least a part of multiple access signatures in the multiple access signature pool may also be acquired based on another multiple access signature pool, where the another multiple access signature pool may be a known multiple access signature pool, for example, may be a multiple access signature pool obtained according to multiple access signatures of grant-based transmission. In an example, the at least a part of the MA signature pool acquired from the another MA signature pool may be expressed as $S=\{s_1, s_2 \ldots s_N\}$, where each element represents one MA signature, and the MA signature pool may be used for N UEs, but of course it is not limited thereto.

After obtaining the MA signature pool according to any of the above methods, a MA signature corresponding to a UE may be obtained from the MA signature pool according to activation information of the user equipment. The activation information of the user equipment is related to activation of the user equipment. As described above, the activation information of the user equipment may be an activation probability of the user equipment, and may also be an activation mode of the user equipment. In an example, the UE may have a periodic mode with an average transmission period T, and accordingly, the relationship with the activation probability of the UE may be obtained indirectly, which, for example, may be expressed as $1/T$. In another example, the UE may have an activation mode of Poisson arrival mode.

The specific operation of acquiring the MA signature or the MA signature group from the MA signature pool according to the activation information of the UE may be performed by the base station. When the MA signature pool is constructed by a deep learning algorithm, optionally, MA signature groups in the MA signature pool may correspond to the number of UEs and UE activation information (UE activation probabilities or corresponding UE activation modes and related parameters). In this example, the base station may obtain a corresponding MA signature group from the MA signature pool according to the total number of UEs in the cell and/or UE activation information, and may subsequently acquire the MA signature that can be used by this UE from the MA signature group by using, for example, random selection or other selection methods, such as, a method of minimizing a collision probability of MA signatures between UEs. Alternatively, the UE may also select the MA signature for use from the MA signature pool or one or more MA signature groups according to the UE activation information by, for example, a random selection method, or further by using the UE activation information.

When the MA signature pool is obtained from another MA signature pool and is expressed as $S=\{s_1, s_2 \ldots s_N\}$, the UE or the base station may obtain a correspondence between UEs and MA signatures in the MA signature pool by solving the following optimization problem, to obtain the MA signature used by the UE. The optimization problem is:

$$\min_{\pi} E_{P(I)}\left[\sum_{i \in I} \sum_{j \neq i, j \in I} |s^*_{\pi(i)} s_{\pi(j)}|\right]$$

where E means to average $\Sigma_{i \in I}\Sigma_{j \neq i, j \neq I}|s^*_{\pi(i)}s_{\pi(j)}|$ in the case where the total number of UEs is N, and the activated UE group I satisfies the distribution $p(I)$; $\pi(i)$ is a sequence mapping function, that is, the $s_{\pi(i)}$-th sequence is mapped to the i-th UE; $s^*_{\pi(i)}$ is the conjugate transpose of $s_{\pi(i)}$; $s^*_{\pi(i)}s_{\pi(j)}$ represents correlation (interference) between the i-th UE and the j-th UE when the i-th UE is interfered by the j-th UE. It can be seen that by solving the above optimization problem, the MA signature obtained from another MA signature pool (such as a known MA signature pool) may correspond to UEs, and interference between activated UEs may be minimized, thereby further improving the performance of the wireless communication system. Therefore, the method of the embodiment of the present disclosure can not only reduce interference of data transmission between UEs by constructing new MA signatures, but also can reduce the interference and increase accuracy of symbol detection by re-adjusting the correspondence between known MA signatures and UEs.

The transmitting unit 2520 transmits at least one of information about the group of multiple access signatures and information about the multiple access signature.

According to an embodiment of the present disclosure, if the MA signature used by the UE is acquired by the UE itself, the UE may directly use the MA signature to transmit data in the subsequent steps. According to another embodiment of the present disclosure, if the MA signature or the MA signature group used by the UE is determined by the base station, the base station needs to notify the UE through downlink transmission, so that the UE can use the selected MA signature, or further select the MA signature for data transmission in the selected MA signature group. Optionally, the MA signature pool, MA signature groups contained therein, and relevant UE activation parameters corresponding to the MA signature groups may be pre-stored on both sides of the UE and the base station; or, optionally, may be pre-configured to the UE by the base station through broadcast signaling such as System Information Blocks (SIBs)/Master Information Blocks (MIBs). Subsequently, the base station may transmit its selected MA signature group and/or MA signature to the UE through RRC signaling for static configuration or L1 layer signaling for semi-dynamic configuration (e.g., Downlink Control Information (DCI)). For example, the base station may use index 1 to indicate an index of the selected MA signature group, and use index 2 to indicate an index of the MA signature in this MA signature group. In the example of the MA signature pool shown in FIG. 6, the base station may transmit index 6 to indicate the MA signature group-6, and transmit index 2 to indicate the second MA signature in the MA signature group-6 at the same time through RRC signaling. Of course, in another example, the base station may also directly inform the UE of the selected MA signature.

Optionally, when the base station transmits the selected MA signature, it can also inform the UE in an implicit manner. In an example, the base station may quantify the selected MA signature into an M-QAM constellation diagram representation, and inform the UE of the result through corresponding signaling. In another example, the base station can also inform the UE of a corresponding constellation model and related parameter values of the selected MA signature. For example, if the MA signature has a parallelogram shape, the base station may inform the UE that the UE constellation diagram is a parallelogram by a pre-appointed related position or bit value, and subsequently inform the UE of the two side lengths of the parallelogram and the angle between them.

In the various grant-free transmission processes shown in FIGS. 2 to 4, when the aforementioned transmission of UE activation information and acquisition of MA signatures are taken into consideration, there may be a corresponding updated signaling interaction process between the UE and the base station. According to an embodiment of the present disclosure, the UE may firstly acquire the activation information of the user equipment; then, the UE transmits the activation information of the user equipment to the base station, so that the base station determines the multiple access signature from the multiple access signature pool according to the activation information of the user equipment; finally, the UE receives information about the multiple access signature indicating the multiple access signature determined by the base station to acquire the multiple access signature. Alternatively, according to another embodiment of the present disclosure, the UE may firstly transmit, to the base station, an indication signal indicating the base station to estimate the activation information of the user equipment, so that the base station estimates the activation information of the UE; then, the UE receives, from the base station, the multiple access signature determined from the multiple access signature pool according to an estimation result of the activation information of the user equipment.

FIG. 7 shows an implementation process of grant-free transmission according to an embodiment of the present disclosure. As shown in FIG. 7, on the basis that the base station configures data transmission resources to the UE and realizes grant-free transmission through RRC signaling as shown in the above FIG. 2, before receiving RRC signaling, the UE may firstly transmit via PRACH the activation information of the UE or an indication signal used to indicate the base station to estimate the activation information of the UE to the base station, so that the base station selects the MA signature used by the UE from the MA signature pool according to the activation information of the UE or an estimation result. Then, the base station may transmit information about the MA signature through RRC signaling, so that the UE transmits uplink data by using the MA signature.

FIG. 8 shows an implementation process of grant-free transmission according to an embodiment of the present disclosure. As shown in FIG. 8, on the basis that the base station configures data transmission resources to the UE and realizes grant-free transmission through RRC signaling and L1 signaling as shown in the above FIG. 3, before receiving RRC signaling and L1 signaling, the UE may firstly transmit via PRACH the activation information of the UE or an indication signal used to indicate the base station to estimate the activation information of the UE to the base station, so that the base station selects the MA signature used by the UE from the MA signature pool according to the activation information of the UE or an estimation result. Then, the base station may transmit information about the MA signature through RRC signaling and L1 signaling, so that the UE transmits uplink data by using the MA signature.

FIG. 9 shows an implementation process of grant-free transmission according to an embodiment of the present disclosure. As shown in FIG. 8, on the basis that the base station configures data transmission resources to the UE and realizes grant-free transmission through RRC signaling and L1 signaling as shown in the above FIG. 3, after receiving RRC signaling and L1 signaling, the UE may transmit via uplink data the activation information of the UE or an indication signal used to indicate the base station to estimate the activation information of the UE to the base station, so that the base station selects the MA signature used by the UE from the MA signature pool according to the activation information of the UE or an estimation result. Then, the base station may transmit information about the MA signature through RRC signaling and L1 signaling, so that the UE transmits uplink data by using the updated MA signature during the next uplink data transmission.

According to another embodiment of the present disclosure, the UE may firstly acquire the activation information of the user equipment; and the UE may acquire the multiple access signature determined from the multiple access signature pool according to the activation information. In one example, the UE may acquire its own activation information. In another example, the UE may also transmit an indication signal to the base station indicating the base station to estimate the activation information of the user equipment, so that the base station estimates the activation information of the UE; then, the UE may receive the estimated activation information of the UE from the base station.

In addition, optionally, the UE may not only acquire the activation information of the user equipment, but also receive information about a group of multiple access signatures transmitted by the base station; then, the UE may determine the multiple access signature according to the activation information of the user equipment and the information about the group of multiple access signatures. The information about the group of multiple access signatures may be determined by the base station itself, or may be determined by estimating the activation information of the UE upon the base station is triggered by the indication information of the UE. FIG. 10 shows an implementation process of grant-free transmission according to an embodiment of the present disclosure. As shown in FIG. 10, based on the implementation process of the contention-based grant-free transmission shown in the previous FIG. 4, the base station may firstly transmit information about one or more MA signature groups via Physical Broadcast Channels (PBCHs), the UE then selects the MA signature for use from the MA signature group transmitted by the base station according to its activation information. Optionally, in the representation of the MA signature pool shown in FIG. 6, for example, when the base station knows the number of UEs in its corresponding cell and the UEs' activation information, it may select one of the MA signature groups for transmission to the UE; when the base station knows only one of the number of UEs in its corresponding cell and the UE's activation information, it may select one column or row of MA signature groups in FIG. 6 for transmission to the UE; when the base station knows neither of the number of UEs in the corresponding cell and the UEs' activation information, it may transmit the entire MA signature pool to the UE for the UE to select from. Optionally, the UE may further select an appropriate MA signature from the MA signature group according to the activation information; or, the UE may randomly select an MA signature from the MA signature group, which is not limited herein. After acquiring the MA signature, the UE may use the MA signature to process data and transmit the processed data.

The base station according to the embodiment of the present disclosure can consider UE activation information reflecting UE activation characteristics in grant-free transmission to provide MA signatures suitable for grant-free transmission, thereby reducing interference of data transmission between UEs, increasing accuracy of symbol detection and improving the performance of the wireless communication system.

<Hardware Structure>

Figure 26:
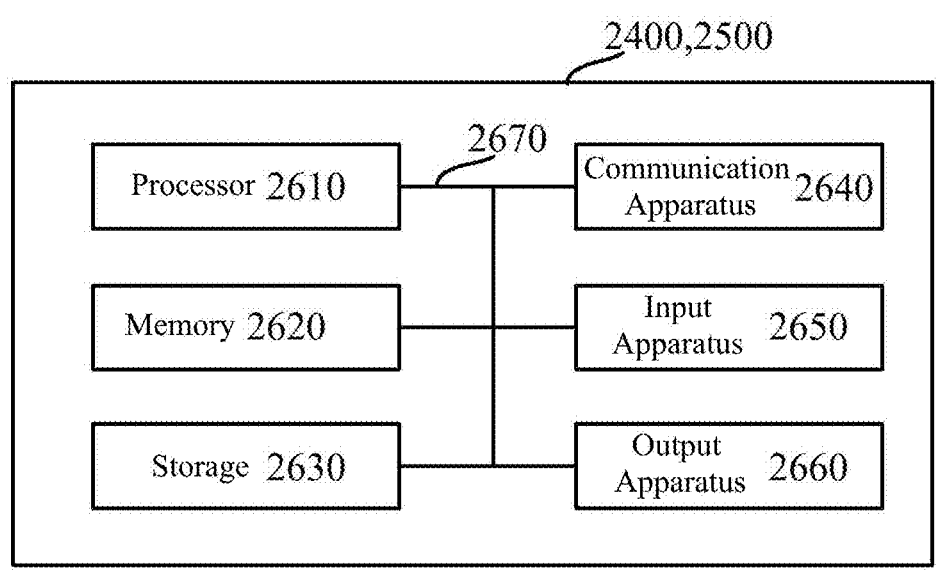
FIG. 26 is a diagram showing an example of a hardware structure of a user equipment and a base station involved according to an embodiment of the present disclosure.

The transmitting device, the receiving device, and the like in an embodiment of the present disclosure may function as a computer that executes the processes of the wireless communication method of the present disclosure. FIG. 26 is a schematic diagram illustrating an example of a hardware structure of a user equipment and a base station involved in one embodiment of the present disclosure. Any of the above user equipment 2400 and base station 2500 may be constituted as a computer apparatus that physically comprises a processor 2610, a memory 2620, a storage 2630, a communication apparatus 2640, an input apparatus 2650, an output apparatus 2660, a bus 2670 and the like In addition, in the following description, terms such as "apparatus" may be replaced with circuits, devices, units, and the like. The hardware structure of the user equipment 2400 and the base station 2500 may include one or more of the respective apparatuses shown in the figure, or may not include a part of the apparatuses.

For example, only one processor 2610 is illustrated, but there may be multiple processors. Furthermore, processes may be performed by one processor, or processes may be performed by more than one processor simultaneously, sequentially, or by other methods. In addition, the processor 2610 may be installed by more than one chip.

Respective functions of the user equipment 2400 and the base station 2500 may be implemented, for example, by reading specified software (program) on hardware such as the processor 2610 and the memory 2620, so that the processor 2610 performs computations, controls communication performed by the communication apparatus 2640, and controls reading and/or writing of data in the memory 2620 and the storage 2630.

The processor 2610, for example, operates an operating system to control the entire computer. The processor 2610 may be constituted by a Central Processing Unit (CPU), which includes interfaces with peripheral apparatuses, a control apparatus, a computing apparatus, a register and the like.

In addition, the processor 2610 reads programs (program codes), software modules and data from the storage 2630 and/or the communication apparatus 2640 to the memory 2620, and execute various processes according to them. As for the program, a program causing computers to execute at least a part of the operations described in the above embodiments may be employed.

The memory 2620 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 2620 may also be referred to as a register, a cache, a main memory (a main storage apparatus) and the like. The memory 2620 may store executable programs (program codes), software modules and the like for implementing wireless communication methods related to one embodiment of the present disclosure.

The storage 2630 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray® disk, a removable disk, a hard driver, a smart card, a flash memory device (e.g., a card, a stick and a key driver), a magnetic stripe, a database, a server, and other appropriate storage media. The storage 2630 may also be referred to as an auxiliary storage apparatus.

The communication apparatus 2640 is a hardware (transceiver device) performing communication between computers via a wired and/or wireless network, and is also referred to as a network device, a network controller, a network card, a communication module and the like, for example. The communication device 2640 may include a high-frequency switch, a duplexer, a filter, a frequency synthesizer and the like to implement, for example, Frequency Division Duplex (FDD) and/or Time Division Duplex (TDD).

The input apparatus 2650 is an input device (e.g., a keyboard, a mouse, a microphone, a switch, a button, a sensor and the like) that receives input from the outside. The output apparatus 2660 is an output device (e.g., a display, a speaker, a Light Emitting Diode (LED) light and the like) that performs outputting to the outside. In addition, the input apparatus 2650 and the output apparatus 2660 may also be an integrated structure (e.g., a touch screen).

Furthermore, the respective apparatuses such as the processor 2610 and the memory 2620 are connected by the bus 2670 that communicates information. The bus 2670 may be constituted by a single bus or by different buses between the apparatuses.

Furthermore, the user equipment 2400 and the base station 2500 may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 2610 may be installed by at least one of the hardware.

(Variations)

In addition, the terms illustrated in the present specification and/or the terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a "pilot", a "pilot signal" and so on, depending on the standard applied. Furthermore, a component carrier (CC) may also be referred to as a cell, a frequency carrier, a carrier frequency, and the like.

In addition, a radio frame may be composed of one or more periods (frames) in the time domain. Each of the one or more periods (frames) constituting the radio frame may also be referred to as a subframe. Further, a subframe may be composed of one or more slots in the time domain. The subframe may be a fixed length of time duration (e.g., 1 ms) that is independent of the numerology.

Furthermore, a slot may be composed of one or more symbols (OFDM (Orthogonal Frequency Division Multiplexing) symbols, SC-FDMA (Single Carrier Frequency Division Multiple Access) symbols, etc.) in the time domain. Furthermore, the slot may also be a time unit based on the numerology. Furthermore, the slot may also include a plurality of microslots. Each microslot may be composed of one or more symbols in the time domain. Furthermore, a microslot may also be referred to as a "subframe".

A radio frame, a subframe, a slot, a microslot and a symbol all represent a time unit during signal transmission. A radio frame, a subframe, a slot, a microslot and a symbol may also use other names that correspond to them, respectively. For example, one subframe may be referred to as a "transmission time interval (TTI)", a plurality of consecutive subframes may also be referred to as a "TTI", and one slot or one microslot may also be referred to as a "TTI." That is, a subframe and/or a TTI may be a subframe (1 ms) in the existing LTE, may be a period of time shorter than 1 ms (e.g., 1 to 13 symbols), or may be a period of time longer than 1 ms. In addition, a unit indicating a TTI may also be referred to as a slot, a microslot and the like instead of a subframe.

Herein, a TTI refers to the minimum time unit of scheduling in wireless communication, for example. For example, in LTE systems, a wireless base station performs scheduling for respective user terminals that allocates radio resources (such as frequency bandwidths and transmission power that can be used in respective user terminals) in units of TTI. In addition, the definition of the TTI is not limited thereto.

The TTI may be a transmission time unit of channel-coded data packets (transport blocks), code blocks, and/or codewords, or may be a processing unit of scheduling, link adaptation and so on. In addition, when the TTI is given, a time interval (e.g., the number of symbols) mapped to transport blocks, code blocks, and/or codewords actually may also be shorter than the TTI.

In addition, when one slot or one microslot is called a TTI, more than one TTI (i.e., more than one slot or more than one microslot) may also become the minimum time unit of scheduling. Furthermore, the number of slots (the number of microslots) constituting the minimum time unit of the scheduling may be controlled.

A TTI having a time duration of 1 ms may also be referred to as a normal TTI (TTI in LTE Rel. 8-12), a standard TTI, a long TTI, a normal subframe, a standard subframe, or a long subframe, and so on. A TTI that is shorter than a normal TTI may also be referred to as a compressed TTI, a short TTI, a partial (or fractional) TTI, a compressed subframe, a short subframe, a microslot, a subslot, and so on.

In addition, a long TTI (e.g., a normal TTI, a subframe, etc.) may also be replaced with a TTI having a time duration exceeding 1 ms, and a short TTI (e.g., a compressed TTI, etc.) may also be replaced with a TTI having a TTI duration shorter than the long TTI and longer than 1 ms.

A resource block (RB) is a resource allocation unit in the time domain and the frequency domain, and may include one or more consecutive subcarriers in the frequency domain. Also, an RB may include one or more symbols in the time domain, and may be one slot, one microslot, one subframe or one TTI duration. One TTI and one subframe may be composed of one or more resource blocks, respectively. In addition, one or more RBs may also be referred to as "physical resource blocks (PRBs (Physical RBs))", "Sub-Carrier Groups (SCGs)", "Resource Element Groups (REGs)", "PRG pairs", "RB pairs" and so on.

Furthermore, a resource block may also be composed of one or more resource elements (REs). For example, one RE may be a radio resource area of one subcarrier and one symbol.

In addition, structures of the radio frames, subframes, slots, microslots and symbols, etc. described above are simply examples. For example, configurations such as the number of subframes included in a radio frame, the number of slots of each subframe or radio frame, the number or microslots included in a slot, the number of symbols and RBs included in a slot or microslot, the number of subcarriers included in an RB, the number of symbols in a TTI, the symbol duration and the cyclic prefix (CP) duration may be variously altered.

Furthermore, the information, parameters and so on described in this specification may be represented in absolute values or in relative values with respect to specified values, or may be represented by other corresponding information. For example, radio resources may be indicated by specified indices. Furthermore, formulas and the like using these parameters may be different from those explicitly disclosed in this specification.

The names used for the parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limited in any respect.

The information, signals and the like described in this specification may be represented by using any one of various different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

Information, signals and the like that are input or output may be stored in a specific location (for example, in a memory), or may be managed in a control table. Information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, downlink control information (DCI), uplink control information (UCI)), higher layer signaling (for example, RRC (Radio Resource Control) signaling, broadcast information (master information blocks (MIBs), system information blocks (SIBs), etc.), MAC (Medium Access Control) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as "RRC messages", for example, RRC connection setup messages, RRC connection reconfiguration messages, and so on. Furthermore, MAC signaling may be reported by using, for example, MAC control elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. A wireless base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. A wireless base station is sometimes referred to as terms such as a fixed station, a NodeB, an eNodeB (eNB), an access point, a transmitting point, a receiving point, a femto cell, a small cell and the like.

A mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, both the user equipment 2400 and the base station 2500 in this specification may be replaced with a wireless base station or a user terminal.

In this specification, specific actions configured to be performed by the wireless base station sometimes may be performed by its upper nodes in certain cases. Obviously, in a network composed of one or more network nodes having wireless base stations, various actions performed for communication with terminals may be performed by the wireless base stations, one or more network nodes other than the wireless base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched and used during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (New Radio Access Technology), NR (New Radio), NX (New radio access), FX (Future generation radio access), GSM® (Global System for Mobile communications), CDMA 2000, UMB (Ultra Mobile Broadband), IEEE 802.11 (Wi-Fi), IEEE 802.16 (WiMAX®), IEEE 802.20, UWB (Ultra-WideBand), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting accessing (e.g., accessing data in a memory), etc. as performing the "deciding (determining)". In addition, the "deciding (determining)" may further regard resolving, selecting, choosing, establishing, comparing, etc. as performing the "deciding (determining)". That is to say, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described above in detail, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

What is claimed is:

1. A user equipment, comprising:
a control unit configured to acquire a multiple access signature, the multiple access signature being determined from a multiple access signature pool according to activation information of the user equipment, the activation information of the user equipment being related to activation of the user equipment;
a transmitting unit configured to transmit data by using the multiple access signature,
wherein:
the control unit acquires the activation information of the user equipment according to at least one of historical activation information and higher layer activation information, wherein the historical activation information indicates information related to historical activation behaviors of the user equipment, and the higher layer activation information is information related to activation of the user equipment notified by a higher layer.

2. The user equipment of claim 1, wherein:
the control unit acquires the multiple access signature determined by the user equipment from the multiple access signature pool according to the activation information.

3. The user equipment of claim 2, wherein:
the user equipment further comprises a receiving unit configured to receive information about a group of multiple access signatures transmitted by a base station, the information about the group of multiple access signatures being used to indicate at least one group of multiple access signatures in the multiple access signature pool, and each group of multiple access signatures including at least one multiple access signature;
the control unit determines the multiple access signature based on the activation information of the user equipment and the information about the group of multiple access signatures.

4. The user equipment of claim 1, wherein:
the control unit acquires the activation information of the user equipment;
the transmitting unit transmits the activation information of the user equipment to a base station, so that the base station determines, from the multiple access signature pool, at least one of the multiple access signature and a group of multiple access signatures according to the activation information of the user equipment;
the user equipment further comprises a receiving unit configured to receive at least one of information about the multiple access signature and the group of multiple access signatures determined by the base station, to acquire the multiple access signature.

5. The user equipment of claim 1, wherein:
the transmitting unit transmits, to a base station, an indication signal indicating the base station to estimate the activation information of the user equipment;
the user equipment further comprises a receiving unit configured to receive information about the multiple access signature from the base station, the information about the multiple access signature being used to indicate the multiple access signature, and the multiple access signature being determined from the multiple access signature pool by the base station according to an estimation result of the activation information of the user equipment.

6. The user equipment of claim 1, wherein the multiple access signature includes at least one of a bit-to-symbol mapping and a spreading sequence.

7. The user equipment of claim 1, wherein:
multiple access signatures in the multiple access signature pool are constructed based on an error rate of symbol detection and an error rate of detection for the user equipment's activation state by using a deep learning algorithm; or
at least a part of multiple access signatures in the multiple access signature pool are acquired based on another multiple access signature pool.

8. A base station, comprising:
a control unit configured to acquire activation information of a user equipment, the activation information of the user equipment being related to activation of the user equipment, and determine, from a multiple access signature pool, at least one of a group of multiple access signatures and a multiple access signature used by the user equipment for data transmission at least according to the activation information of the user equipment, each group of multiple access signatures including at least one multiple access signature;
a transmitting unit configured to transmit at least one of information about the group of multiple access signatures and information about the multiple access signature,
wherein, the activation information of the user equipment is acquired according to at least one of historical activation information and higher layer activation information, wherein the historical activation information indicates information related to historical activation behaviors of the user equipment, and the higher layer activation information is information related to activation of the user equipment notified by a higher layer.

9. A method executed by a user equipment, the method comprising:

acquiring a multiple access signature, the multiple access signature being determined from a multiple access signatures pool according to activation information of the user equipment, the activation information of the user equipment being related to activation of the user equipment;

transmitting data by using the multiple access signature, wherein, the acquiring a multiple access signature further comprises acquiring the activation information of the user equipment according to at least one of historical activation information and higher layer activation information, wherein the historical activation information indicates information related to historical activation behaviors of the user equipment, and the higher layer activation information is information related to activation of the user equipment notified by a higher layer.

\* \* \* \* \*